(12) United States Patent
Gordon

(10) Patent No.: US 10,776,470 B2
(45) Date of Patent: *Sep. 15, 2020

(54) VERIFYING IDENTITY BASED ON FACIAL DYNAMICS

(71) Applicant: Microsoft Technology Licensing, LLC, Redmond, WA (US)

(72) Inventor: John C. Gordon, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/355,045

(22) Filed: Mar. 15, 2019

(65) Prior Publication Data

US 2019/0213314 A1  Jul. 11, 2019

Related U.S. Application Data

(63) Continuation of application No. 15/284,499, filed on Oct. 3, 2016, now Pat. No. 10,282,530.

(51) Int. Cl.
| | |
|---|---|
| *G06F 21/32* | (2013.01) |
| *G06K 9/00* | (2006.01) |
| *G06T 7/20* | (2017.01) |
| *H04N 5/232* | (2006.01) |

(52) U.S. Cl.
CPC ......... *G06F 21/32* (2013.01); *G06K 9/00308* (2013.01); *G06K 9/00315* (2013.01); *G06T 7/20* (2013.01); *G06T 2207/30201* (2013.01); *H04N 5/23219* (2013.01)

(58) Field of Classification Search
None
See application file for complete search history.

(56) References Cited

U.S. PATENT DOCUMENTS

| | | | | |
|---|---|---|---|---|
| 5,410,609 | A * | 4/1995 | Kado | G06K 9/00288 340/5.83 |
| 10,282,530 | B2 * | 5/2019 | Gordon | G06T 7/20 |
| 2001/0033675 | A1 * | 10/2001 | Maurer | G06K 9/00228 382/103 |
| 2005/0057569 | A1 * | 3/2005 | Berger | G06T 13/40 345/473 |
| 2013/0015946 | A1 * | 1/2013 | Lau | G07C 9/00 340/5.2 |

(Continued)

*Primary Examiner* — Justin P. Misleh
(74) *Attorney, Agent, or Firm* — NovoTechIP International PLLC

(57) ABSTRACT

A computer-implemented technique is described for verifying the identity of a user using two components of face analysis. In a first part, the technique determines whether captured face information matches a previously stored structural face signature pertaining to the user. The structural face signature describes, at least in part, gross structural characteristics of the face that are largely invariant from pose to pose. In the second part, the technique determines whether the captured face information matches a dynamic face signature associated with the user. The dynamic face signature describes movement of parts of the face over a span of time as the user performs a gesture, and the correlation of different parts of the face during the movement. The technique reduces the risk that a malicious actor can successfully artificially duplicate the appearance of an authorized user.

15 Claims, 15 Drawing Sheets

(56) References Cited

U.S. PATENT DOCUMENTS

2014/0165187 A1* 6/2014 Daesung .................. G06F 21/32
                                                          726/19
2017/0124383 A1* 5/2017 Ohbitsu .................... G06T 7/74

* cited by examiner

HIGH-LEVEL FACE SIGNATURE
- "a" POINTS MOVE WITH "b" POINTS;
- "c" POINTS MOVE WITH "d" POINTS;
- "a" POINTS MOVE WITH "c" POINTS, BUT IN A COMPLEMENTARY DIRECTION;
- "b" POINTS MOVE WITH "d" POINTS, BUT IN A COMPLEMENTARY DIRECTION;
- "e" POINTS MOVE WITH "f" POINTS, BUT IN A COMPLEMENTARY DIRECTION;
- ETC.

ANY LOCAL/REMOTE DISTRIBUTION OF FACE PROCESSING FUNCTIONALITY

VERIFYING IDENTITY BASED ON FACIAL DYNAMICS

CROSS-REFERENCE TO RELATED APPLICATIONS

This patent application is a continuation of, and claims priority to, U.S. patent application Ser. No. 15/284,499, filed on Oct. 3, 2016, which is incorporated herein by reference in its entirety.

BACKGROUND

Traditional face recognition systems operate by capturing and storing information that describes the unique characteristics of a person's face (constituting enrollment-phase face information). When the user later seeks access to a protected resource, the recognition system captures verification-phase face information, and then compares the verification-phase face information with the stored enrollment-phase face information. The recognition grants access to the protected resource when the enrollment-phase face information matches the verification-phase face information.

While the use of face recognition systems is becoming more prevalent, these systems remain vulnerable to spoofing attacks. For example, some traditional face recognition systems operate by extracting pose-invariant features pertaining to a user's face, such as the pose-invariant distances between various landmarks on the user's face. There remains a risk that a malicious actor can gain access to protected resources by presenting a photograph or three-dimensional bust to such a face recognition system, where that photograph or bust duplicates the appearance of an authorized user. The industry has countered this threat by using various liveness tests for discriminating between a live human user and a simulation thereof. But it remains at least theoretically possible for a malicious actor to spoof even these liveness tests. For example, if a recognition system makes verification conditional on the user performing successive actions, a malicious actor can successively present photographs or busts which provide static "snapshots" of these actions.

SUMMARY

A computer-implemented technique is described for verifying the identity of a user using two phases of face analysis, which can be performed successively or at the same time. In a first phase, the technique determines whether captured face information matches a previously stored structural face signature pertaining to the user. The structural face signature describes, at least in part, gross structural characteristics of the face that are largely invariant from pose to pose. In the second phase, the technique determines whether the captured face information matches a dynamic face signature associated with the user. The dynamic face signature encodes movement of parts of the face over a span of time as the user performs a gesture of any kind. Further, the dynamic face signature describes relations among the different parts during their movement, e.g., by indicating that a first cluster of feature points moves in unison with respect to a second cluster of feature points. Altogether, the technique verifies the identity of the user when the captured face information passes the first and second parts of the above-described test.

According to one benefit, the dynamic face signature describes subtle ways in which a person's face changes shape during a gesture, not merely the binary fact that the person has performed a prescribed gesture or not. This characteristic greatly decreases the risk that a malicious actor can spoof the technique by duplicating the appearance of an authorized user through a photograph or three-dimensional model.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
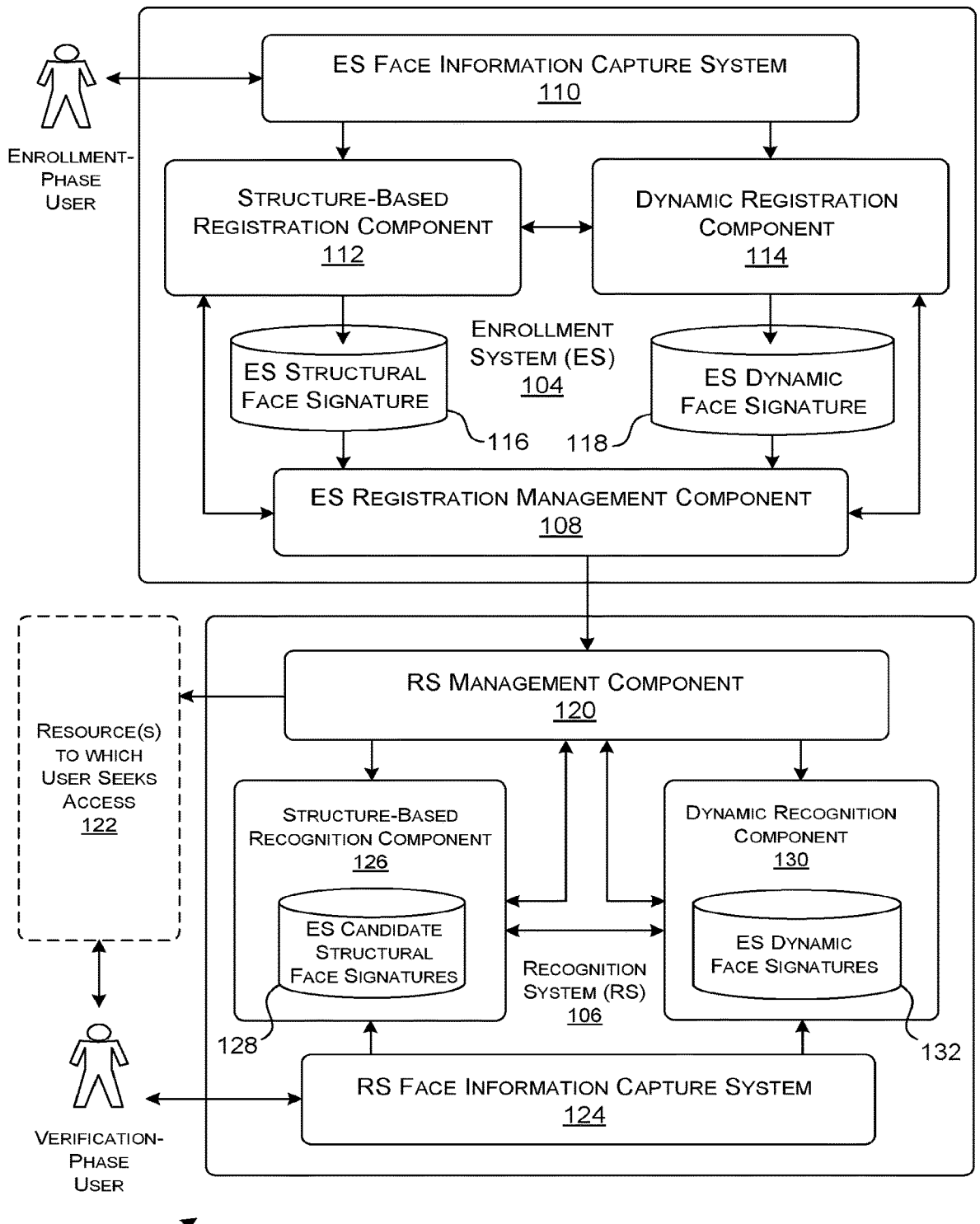
FIG. 1 shows an overview of a system environment that includes an enrollment system for registering face signatures, and a recognition system for verifying a user based on the registered face signatures.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system environment for verifying the identity of a user based on the material dynamics of that person's face. Section B sets forth illustrative methods which explain the operation of the system environment of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or other logic hardware (e.g., FPGA devices), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or other logic hardware (e.g., FPGA devices), etc., or any combination thereof.

As to terminology, the phrase "configured to" encompasses various physical and tangible mechanisms for performing an identified operation. The mechanisms can be configured to perform an operation using, for instance, software running on computer equipment, or other logic hardware (e.g., FPGA devices), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, or other logic hardware (e.g., FPGA devices), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System Environment

A.1. Overview

FIG. 1 shows an overview of a system environment 102 that includes an enrollment system (ES) 104 for registering face signatures, and a recognition system (RS) 106 for verifying a user based on the registered face signatures. To facilitate explanation, FIG. 1 shows that the enrollment system 104 corresponds to separate equipment from the recognition system 106. While that represents one viable implementation, in other cases, the enrollment system 104 and the recognition system 106 can share resources. Indeed, in one system, a single computing system performs all of the functions of the enrollment system 104 and the recognition system 106. When operating in a first mode, the single computing system stores face signatures associated with a user. When operating in a second mode, the single computing system verifies the identity of the user based on the face signatures that have been stored.

This description uses the prefix "ES" when referring to a component or piece of information associated with the enrollment system 104, and the prefix "RS" when referring to a component or piece of information associated with the recognition system 106. But as noted above, any ES component and its counterpart RS component could refer to the same equipment.

As used herein, a "face signature" represents any information that describes the characteristics of the user's face.

As will be described below, different implementations can use different information items to construct a face signature. Further, different implementations can use different techniques to encode the information items in a face signature.

Beginning with the enrollment system 104, that system includes an ES registration management component 108. The ES registration management component 108 provides a voice and/or graphical user interface presentation (not shown) which guides the user through a registration process. For example, the ES registration management component 108 may ask the user to perform a gesture that involves some kind of contortion of the user's face, such as a blinking gesture, smiling gesture, grimacing gesture, etc. In some cases, the ES registration management component 108 asks the user to repeat the same gesture one or more times. Alternatively, or in addition, the ES registration management component 108 may ask the user to perform a set of different gestures. Finally, the ES registration management component 108 archives the face signatures that it creates, making these signatures available to the recognition system 106.

The enrollment system 104 also includes an ES face information capture system 110 for capturing face information that describes the face of a user who is registering his or her identity. As will be described below with reference to FIG. 2, the ES face information capture system 110 can capture two-dimensional face information (e.g., using a conventional video capture device) and/or three-dimensional face information (e.g., using a depth capture system). In any case, the face information includes multiple instances (e.g., frames or samples) of face information captured at different respective times, e.g., over the course of the gesture performed by the user.

The enrollment system 104 further includes a structure-based registration component 112 and a dynamic registration component 114. The structure-based registration component 112 generates at least one ES structural face signature based on the captured ES face information, and then stores the ES structural face signature(s) in a data store 116. (To facilitate description, it will henceforth be assumed that the structure-based registration component 112 generates a single ES structural face signature.) The structure-based registration component 112 performs its task by generating an ES face signature that, at least in part, emphasizes the gross pose-invariant structural features of the user's face. For instance, the structure-based registration component 112 can generate a structural face signature which represents the pose-invariant distances between different landmarks of the user's face.

In contrast, the dynamic registration component 114 generates at least one ES dynamic feature signature based on the captured ES face information, and then stores the ES dynamic face signature(s) in a data store 118. (To facilitate description, it will henceforth be assumed that the dynamic registration component 114 generates a single ES dynamic face signature.) The dynamic registration component 114 performs its task by generating a face signature that emphasizes the way in which the user's face moves throughout the gesture, and, in particular, the way in which different parts of the user's face move in relation to other parts. In doing so, the dynamic registration component 114 emphasizes ephemeral parts of the captured face information that may be ignored in whole or in part by the structure-based registration component 112. Note that the dynamic face signature is unique to a user because it depends on the unique material dynamics of a person's face, which, in turn, depends on a complex set of physiological factors (bone structure, fat content, muscle operation, etc.) and behavioral factors.

The structure-based registration component 112 and the dynamic registration component 114 can generate the ES structural face signature and the ES dynamic face signature, respectively, based on the same instance of ES face information or different instances of ES face information. In the former case, the structure-based registration component 112 can generate the ES structural face signature based on at least a first sample of ES face information, e.g., at the start of a gesture at time $t_1$. The dynamic registration component 114 can generate the dynamic face signature based on all of the samples of the ES face information $(t_1, t_2, \ldots t_n)$, representing the entire course of the gesture.

Further note that different implementations can invoke the structure-based registration component 112 and the dynamic registration component 114 at different respective times. In a first implementation, the enrollment system 104 generates the ES structural face signature prior to the dynamic face signature. In a second implementation, the enrollment system 104 generates the ES dynamic face signature prior to the ES structural face signature. In a third implementation, the enrollment system 104 can generate the ES structural face signature and the ES dynamic face signature as parallel processes, at least in part.

Consider the second case described above, in which the enrollment system 104 generates the ES dynamic face signature prior to the ES structural face signature. The structure-based registration component 112 can benefit from this mode by leveraging the results of the dynamic registration component 114 in its own operation. For example, consider the scenario in which the user chooses to perform a gesture that involves blinking with one eye, without significant changes in other parts of the user's face (e.g., the user's lips, nose, etc.). The dynamic registration component 114 can first identify that the gesture depends in large part on movement of one eye. The structure-based registration component 112 can then generate an ES structural face signature which emphasizes the pose-invariant structural features of the user's eyes, rather than, for example, the user's mouth. By virtue of this manner of operation, the enrollment system 104 can generate a structural face signature that is more closely related to the ES dynamic feature signature, which, in turn, further reduces the risk that a malicious actor can spoof the face signatures generated by the enrollment system 104.

With respect to the recognition system (RS) 106, that system includes elements that are the counterparts of the above-described elements of the enrollment system 104. An RS management component 120, for instance, guides the user through an identity verification process. For example, the user may present one or more user interface presentations (not shown) which ask the user to perform the characteristic gesture captured by the enrollment system 104. If successful, the RS management component 120 grants the user access to at least one resource 122. The resource(s) 122 may correspond to a computing resource. For instance, the RS management component 120 can control access to a computing device or system, a particular account, an individual content item (such as a file, etc.). In another case, the resource(s) 122 may correspond to part of a building or geographical region, etc.; here, the RS management component 120 may control a gate which allows access to the building or area. These examples of protected resources are cited way of illustration, not limitation; the RS management component 120 can control access to any protected asset.

An RS face information capture system 124 is the counterpart of the ES face information capture system 110. It generates face information for the user who presents himself or herself for identity verification, e.g., in response to the user performing his or her telltale gesture when requested. In order to clarify the phase at which face information has been captured, the description below uses the term RS face information to refer to face information captured by the RS face information capture system 124, as opposed to ES face information captured during the enrollment process.

A structure-based recognition component 126 verifies the identity of the user based on the RS face information, with respect to the previously captured ES structural face signature, provided in a data store 128. A dynamic recognition component 130 verifies the identity of the user based on the RS face information, with respect to the previously captured ES dynamic face signature, provided in a data store 132. The RS management component 120 grants access to the resource(s) 122 when the user is successfully verified by both the structure-based recognition component 126 and the dynamic recognition component 130.

More specifically, assume that the user presents himself to the recognition system 106 as "user X" (where "X" generically corresponds to any identifier associated with the user). In one implementation, the structure-based recognition component 126 first compares the RS face information against each candidate ES structural signature, within a pool of candidate ES structural signatures. The candidate ES structural signatures are associated with a plurality of respective users who have previously enrolled via the enrollment system 104. One such candidate ES structural face signature is the ES structural face signature associated with the user X. The structure-based recognition component 126 provisionally determines that the user is user X when: (a) the RS face information matches the user X's ES face signature with a highest probability (with respect to other candidate ES face signatures); and (b) this probability is also above a prescribed environment-specific threshold indicating that a match has occurred. In other words, the structure-based recognition component 126 performs a multi-class recognition operation by determining the most likely classification of the user seeking verification, selected from among a plurality of choices. The dynamic recognition component 130 can then perform a binary classification operation by determining whether the captured RS face information matches the ES dynamic face signature associated with the user X.

Other implementations are possible. For example, the structure-based recognition component 126 can load user X's ES structural face signature when the user makes an assertion that he or she is user X. The structure-based recognition component 126 can then perform a binary classification task by only determining whether the RS face information matches the user X's ES structural face signature. In another case, the dynamic recognition component 130 can perform a multi-class classification operation by comparing the RS face information with each of a plurality of previously registered candidate ES dynamic face signatures.

Finally, note that the enrollment system 104 can also perform preliminary analysis to determine whether the captured ES face information is sufficient to later identify the user. For instance, after the enrollment system 104 derives its ES face signatures, the ES registration management component 108 can ask the user to repeat the gesture. It then determines whether the previously computed ES face signatures can be successfully used to verify the identity of the user based on the last-performed gesture. If this verification fails, the ES registration management component 108 can ask the user to repeat the gesture. On the basis of the newly captured ES face information, the enrollment system 104 updates and refines its ES face signatures. The ES registration management component 108 repeats this process until the last-performed gesture is successfully interpreted based on the previously computed ES face signatures. In performing this enrollment-phase verification, the enrollment system 104 leverages use of the recognition system 106 to interpret the last-provided gesture.

The enrollment system 104 can process repeated gestures in different ways. In one approach, the enrollment system 104 can generate robust face signatures which incorporate information extracted from plural gestures, e.g., by averaging information obtained from different gestures, and/or by concatenating information obtained from the different gestures, and so on. In any case, by processing repeated gestures, the enrollment system 104 can learn the acceptable bounds of the user's gesture. To simplify and facilitate explanation, however, the following explanation with emphasize the case in which the enrollment system 104 generates its ES signatures based on a single gesture performed by the user.

Figure 2:
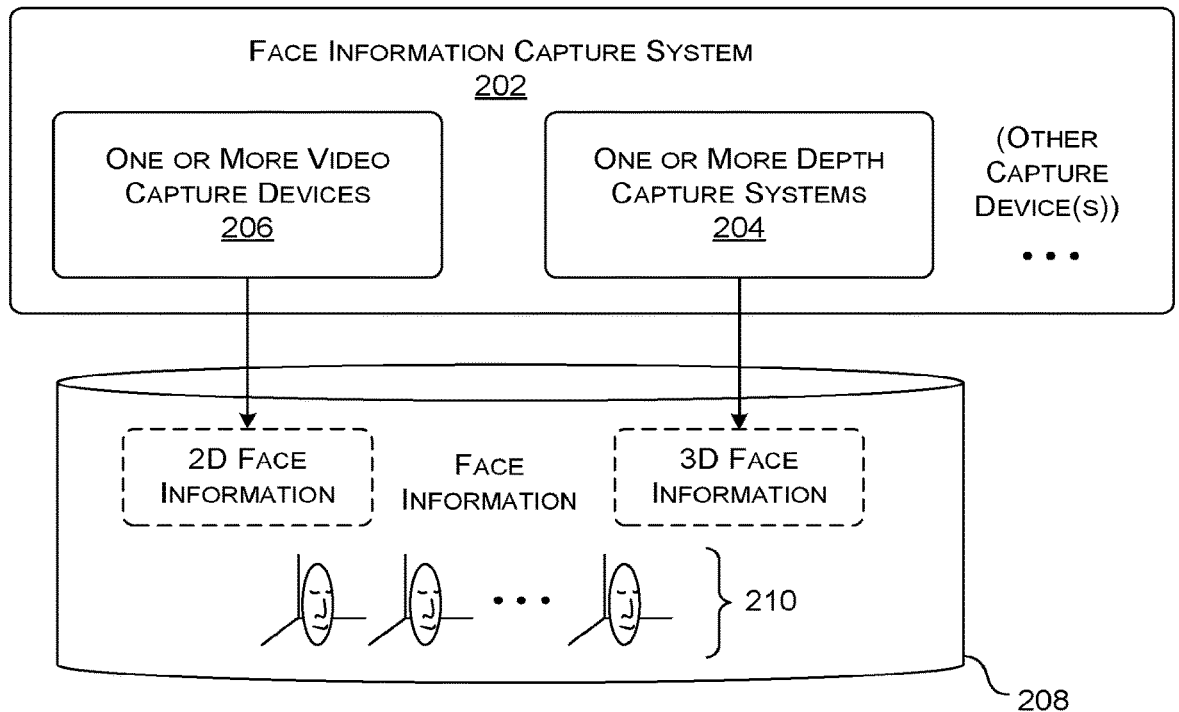
FIG. 2 shows a capture system for use in capturing face information in the system environment of FIG. 1.

FIG. 2 shows a face information capture system 202 ("capture system" for brevity) for use in capturing face information in the system environment 102 of FIG. 1. For example, the capture system 202 can correspond to either the ES face information capture system 110 (used by the enrollment system 104) or the RS face information capture system 124 (used by the recognition system 106).

The capture system 202 can use one or more depth capture systems 204 for capturing three-dimensional (3D) face information. In one specific implementation, the depth capture systems 204 use the KINECT device provided by MICROSOFT CORPORATION of Redmond, Wash. to generate 3D face information.

More generally, one kind of depth capture system operates by irradiating a scene (including the user's face) using any kind electromagnetic radiation. For example, the depth capture system can use an infrared light source to generate structured light which provides a pattern of elements (e.g., dots, lines, etc.). The depth capture system projects the structured light onto the scene. The structured light deforms as it is cast over the surfaces of the objects in the scene, including the user's face. The depth capture system then captures the manner in which the structured light is deformed. Based on that captured information, the depth camera system derives the distances between different parts of the scene and a reference point. These distances, in turn, reflect the three-dimensional shapes of objects in the scene. Other depth capture systems can use other techniques to capture 3D face information, such as a stereoscopic technique, a sound-based sonar-like technique, etc.

Alternatively, or in addition, the capture system 202 can provide one more video capture devices 206 for capturing two-dimensional (2D) face information. For example, the video capture devices 206 can include conventional video cameras for capturing RGB video information using charge-coupled sensing devices.

A data store 208 stores the face information. The face information includes multiple instances 210 of face information, e.g., corresponding to multiple samples (e.g., frames) of 3D face information associated with respective capture times. The multiples instances 210 of face information collectively represent the user's gesture.

Figure 3:
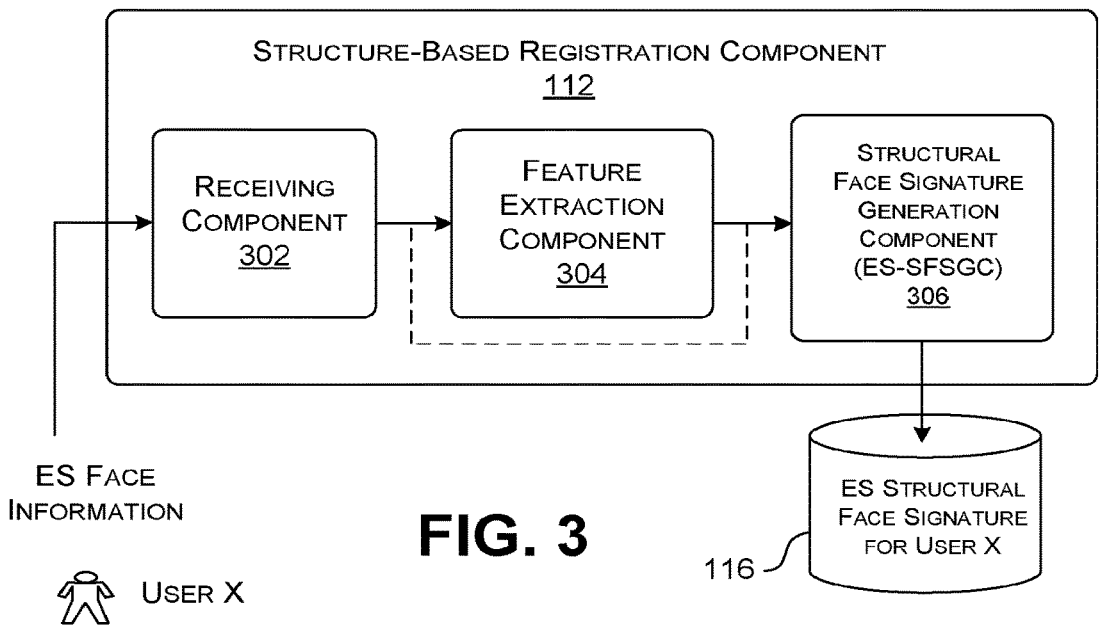
FIG. 3 shows one implementation of a structure-based registration component, which is an element of the enrollment system of FIG. 1.

FIG. 3 shows one implementation of the structure-based registration component 112, which is an element of the enrollment system 104 of FIG. 1. The structure-based recognition component 112 generates the ES structural face signature for a hypothetical user X. From a high-level perspective, the structure-based registration component 112, by itself, corresponds to any conventional or custom-built face registration component that generates a face signature based, in part, on gross pose-invariant features of a person's face. For example, the structure-based registration component 112 can be implemented as the well-known Viola-Jones face recognizer described in P. Viola and M. Jones, "Rapid Object Detection using a Boosted Cascade of Simple Features," Proceedings of the 2001 IEEE Computer Society Conference on Computer Vision and Pattern Recognition, Vol. 1, December 2001, pp. 1-511 to 1-518.

More generally, the structure-based registration component 112 can include a receiving component 302 for receiving ES face information from the ES face information capture system 110. The ES face information includes at least one instance (e.g., one frame or sample) of ES face information. In other implementations, the ES face information includes plural successive frames or samples of ES face information, although this is not required.

A feature extraction component 304 then extracts features from the face information using any technique for combination of techniques. For example, the feature extraction component 304 can compute Haar-like features (as in the Viola-Jones face recognizer). In other cases, the feature extraction component 304 can perform any of: Principal Component Analysis (PCA), Kernel PCA analysis, Linear Discriminant Analysis (LDA), Active Shape Model (ASM) processing, Active Appearance Model (AAM) processing, Elastic Bunch Graph Matching (EBGM), Scale-Invariant Feature Transform (SIFT) processing, Hessian matrix processing, and so on. In many cases, the features generated by the feature extraction component 304 describe the principal landmarks in the user's face. For example, a collection of the features can describe the contour of the user's eyes, nostril areas, clips, ears, etc.

Figure 4:
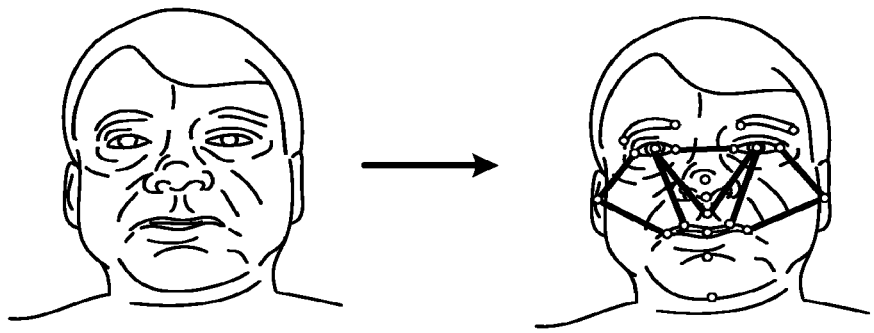
FIG. 4 depicts one manner of operation of the structure-based registration component of FIG. 3, with respect to a sample of captured face information.

An ES structural face signature generation component (ES-SFSGC) 306 generates at least one structural face signature based on the extracted features supplied by the feature extraction component 304. The ES-SFSGC 306 performs this task by identifying characteristics of the user's face that are largely invariant with respect to the user's pose and other environment-specific factors. For instance, as depicted in FIG. 4, the ES-SFSGC 306 can generate signature information that describes the distances between feature points associated the user's mouth, nostril region, chin, eye centers, etc.

Figure 5:
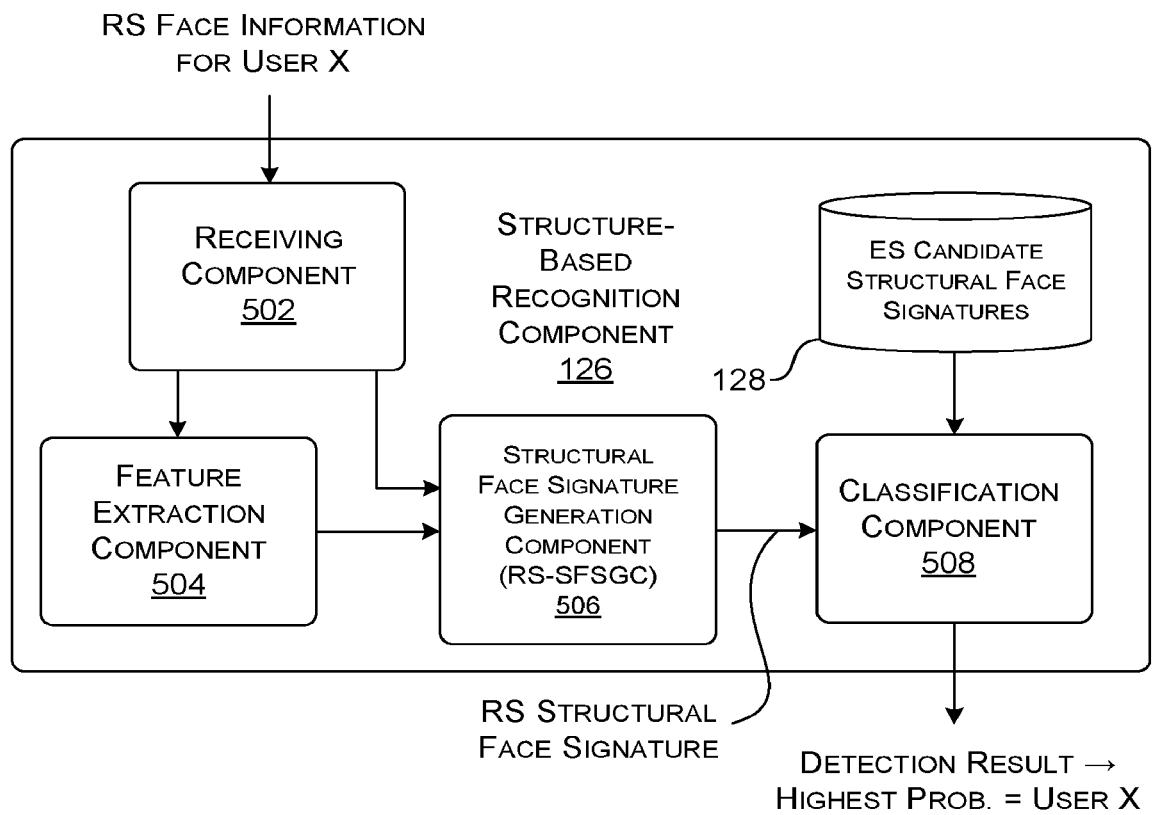
FIG. 5 shows one implementation of a structure-based recognition component, which is an element of the recognition system of FIG. 1.

FIG. 5 shows one implementation of the structure-based recognition component 126, which is an element of the recognition system 106 of FIG. 1. The structure-based recognition component 126 determines whether the RS information matches the ES structural face signature associated with the user X.

In one implementation, the structure-based recognition component 126 includes a receiving component 502, feature extraction component 504, and an RS structural face signature generation component (RS-SFSGC) 506. These three components (502, 504, 506) perform the same functions as the same-named components of the structure-based registration component 112 described in FIG. 3, but with respect to RS face information, rather than ES face information. That is, the receiving component 502 receives at least one frame of the RS face information, the feature extraction component 504 extracts features from the RS face information, and the RS-SFSGC 506 generates at least one RS structural face signature based on the extracted features. The RS structural face signature emphasizes aspects of the user's face that are largely invariant to pose and other environment-related factors.

Next, a classification component 508 compares the RS structural face signature with each of a plurality of candidate ES structural face signatures provided in the data store 128. These structural face signatures are associated with a plurality of respective users (including the user X). The classification component 508 then identifies the ES structural face signature that has the highest probability of matching the RS structural face signature, and the user associated therewith. In the scenario described herein, assume that the classification component 508 concludes, with a requisite degree of confidence, that the RS face information belongs to user X. The classification component 508 can be implemented in any manner, such as by any type of machine-trained statistical model, etc.

Figure 6:
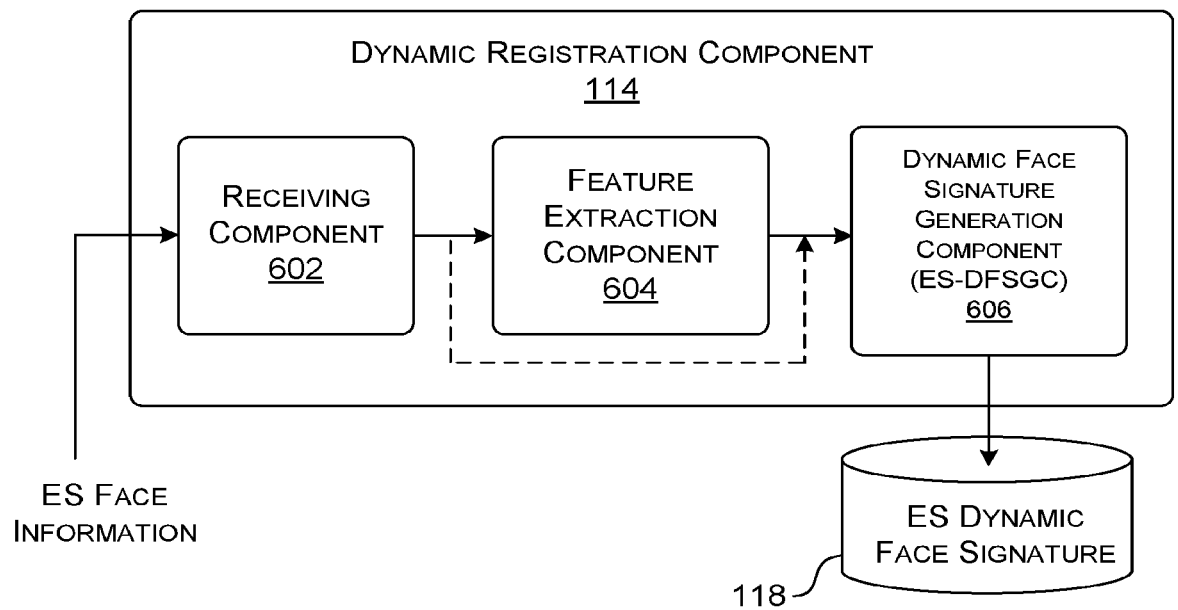
FIG. 6 shows one implementation of a dynamic registration component, which is another element of the enrollment system of FIG. 1.

FIG. 6 shows one implementation of the dynamic registration component 114, which is another element of the enrollment system 106 of FIG. 1. The dynamic registration component 114 includes a receiving component 602 for receiving the ES face information from the ES face information capture system 110. In this case, the ES face information includes a plurality of frames of ES face information occurring at respective times, over the course of a gesture that the user has performed. A feature extraction component 604 optionally extracts features from the ES face information. For instance, the feature extraction component 604 can use any techniques described above in the context of the explanation of FIG. 3.

An ES dynamic face signature generation component (ES-DFSGC) 606 then generates at least one dynamic face signature based on the extracted features. The ES-DFSGC 606 generally performs this task by describing the manner in which feature points move over the course of the gesture, and, more specifically, the manner in which the feature points move relative to each other. Subsections A.2, A.3, A.4, and A.5 (below) describe four illustrative implementations of the ES-DFSGC 606.

In another implementation, the dynamic registration component 114 omits the feature extraction component 604. In that case, the ES-DFSGC 606 operates directly on the input ES face information. The ES-DFSGC 606 can be said to inherently identify the feature points in the course of its processing. This implementation applies, for instance, to the case (described in Subsection A.4) in which the ES-DFSGC 606 corresponds to a deep-learning neural network that directly receives the raw ES face information as an input. But alternatively, a deep-learning neural network can operate on feature points provided by the feature extraction component 604.

Figure 7:
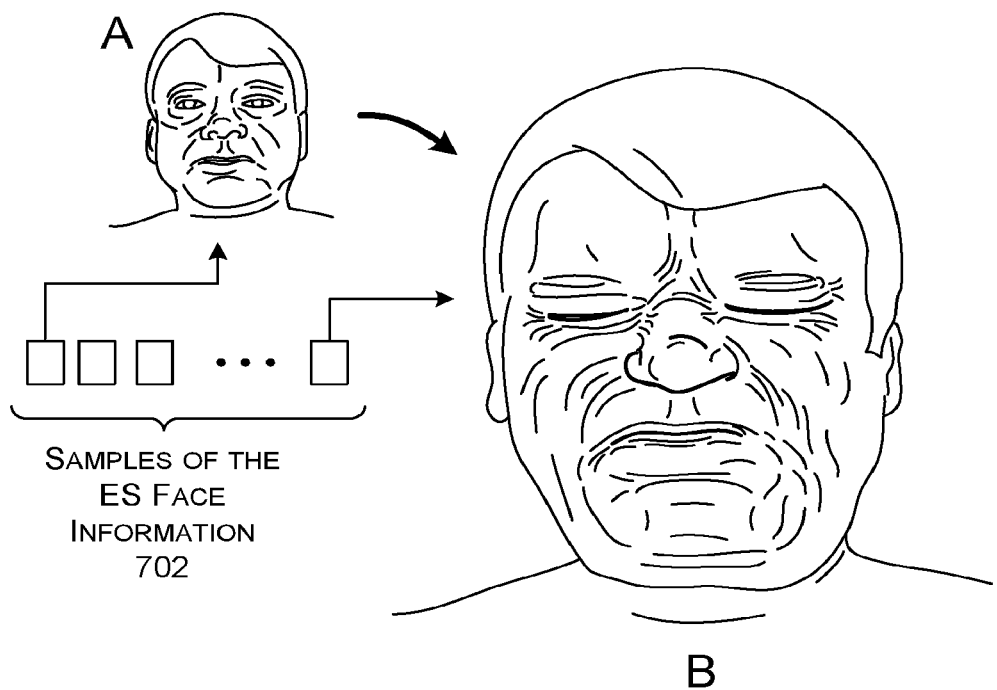
FIGS. 7 and 8 depict one manner of operation of the dynamic registration component of FIG. 6, with respect to successive instances of the captured face information.
Figure 8:
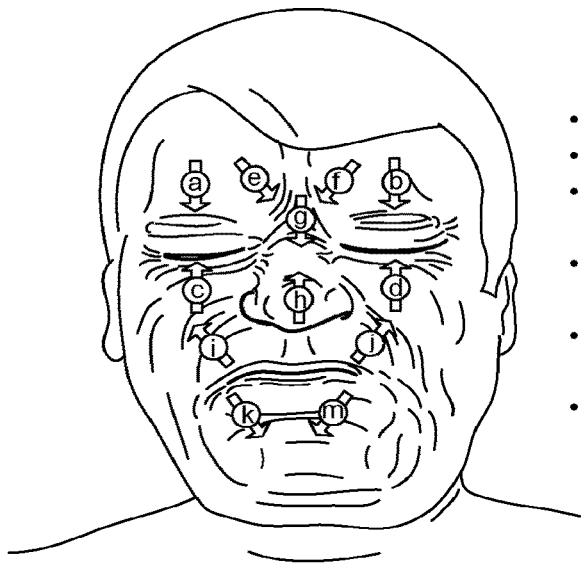

FIGS. 7 and 8 together provide a high-level overview of the operation of the ES-DFSGC 606. This overview applies to all four implementations described below. Assume that the ES face information capture system 110 captures ES face information 702 in which the user makes a grimace gesture. More specifically, in the first frame, the user adopts a relatively neutral facial expression. By the completion of the gesture, the user has tightly shut both eyes and scrunched up his nose. In other examples (not shown), the user may make other telltale gestures, such as one-eyed winks, yawns, smirks, puffed out cheeks, snarls, raised eyebrows, wide-eyed stares, etc. While many of these gestures are dramatic in nature, the system environment 102 also provides viable results for more subtle gestures, such as looks of consternation, bemusement, etc.

From a high-level perspective, the ES-DFSGC 606 generates a dynamic face signature which catalogs the movement of feature points over the course of the gesture. For example, FIG. 8 shows a collection of letter-labeled arrows. Each arrow designates a collection of feature points that generally move in the direction of the arrow. The ES-DFSGC 606 generates an ES dynamic face signature which conveys that the points associated with arrow "a" move in the same direction (and in general unison) with the points associated with arrow "b." The ES dynamic face signature also conveys that the points associated with arrow "c" move in the same direction (and in general unison) with the points associated with the arrow "d." The ES dynamic face signature also identifies that the points associated with arrow "a" move in a complementary (here, opposite) direction (and in general unison) with the points associated with arrow "c," and so on. In other cases, the ES dynamic signature can describe relations of a sequential nature (e.g., by indicating the one movement precedes another movement). In other cases, the ES dynamic signature can describe relations that do not necessarily involve co-movement, such as when movement of a first collection of feature points appear to only occur when a second collection of feature points remain stationary.

Figure 9:
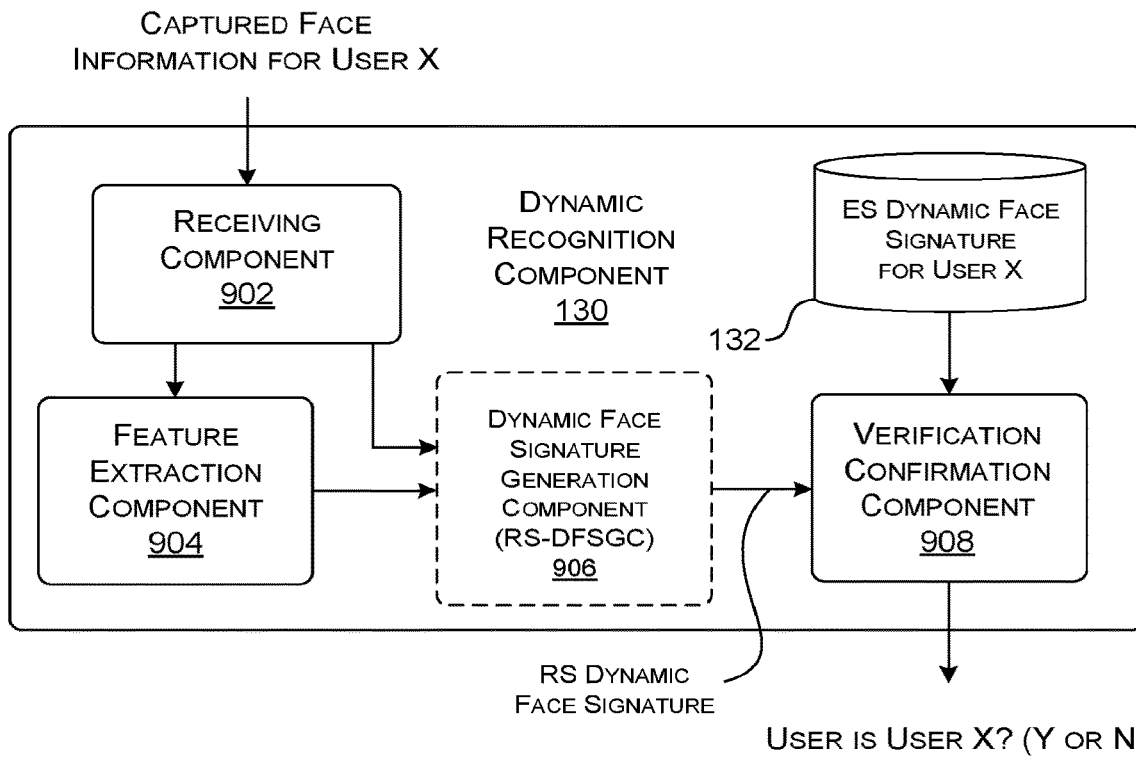
FIG. 9 shows one implementation of a dynamic recognition component, which is another element of the recognition system of FIG. 1.

FIG. 9 shows one implementation of the dynamic recognition component 130, which is another element of the recognition system 106 of FIG. 1. The dynamic recognition system 130 includes a receiving component 902, an (optional) feature extraction component 904, and an RS dynamic face signature generation component (RS-DFSGC) 906. All three components (902, 904, 906) perform the same functions as the same-named components of the dynamic registration component 114 of FIG. 6, but with respect to the RS face information rather than ES face information. The receiving component 502 (of FIG. 5) and the receiving component 902 may correspond to parts of an overall receiving component provided by the recognition system 106. The RS-DFSGC 906 culminates in producing a verification-phase RS dynamic face signature.

A verification confirmation component 908 determines whether the RS dynamic face signature matches the stored ES dynamic face signature (associated with the user X identified by the structure-based recognition component 136), as stored in the data store 132. If so, the verification component 908 confirms that the user who is present before the recognition system 106 is indeed user X.

In some implementations, the dynamic recognition component 130 can omit the RS-DFSGC 906. In that case, the verification component 908 can directly operate on the feature points (or the raw RS face information) to verify whether the presented user is user X. Subsection A.5 (below) describes one implementation that adopts such a configuration.

As a first overall point, note that the ES dynamic face signature captures the material dynamics in which the user's face moves, rather than the binary fact that the user has performed a particular gesture. By virtue of this aspect, the recognition system 106 can successfully verify the identity of the user when the user performs variations of his or her enrollment-phase gesture. For example, assume that the user performs a grimace gesture during the verification phase, but not as dramatically as the gesture illustrated in FIG. 7. Insofar as the less-dramatic grimace invokes the same material dynamics of the face, the recognition system 106 can successfully identify the user based on the less-dramatic gesture. This is particularly true in those implementations (described below) in which the dynamic recognition component 130 generates a normalized summary of the facial dynamics, which has the effect of reducing the importance of the intensity at which the user performs the gesture.

At the same time, the recognition system 106 still relies on the user to perform some kind of gesture. This provision helps ensure that the recognition system 106 will not inadvertently unlock the resource(s) 122 when the user appears before the RS face information capture system 124, but does not intend to unlock the resource(s) 122.

As a second point, as noted above, the material dynamics of a user's face is a complex phenomenon. The system environment 102 leverages this characteristic to reduce the risk that a malicious actor can artificially recreate the material dynamics.

A.2. Dynamic Time Warping Implementation

Figure 10:
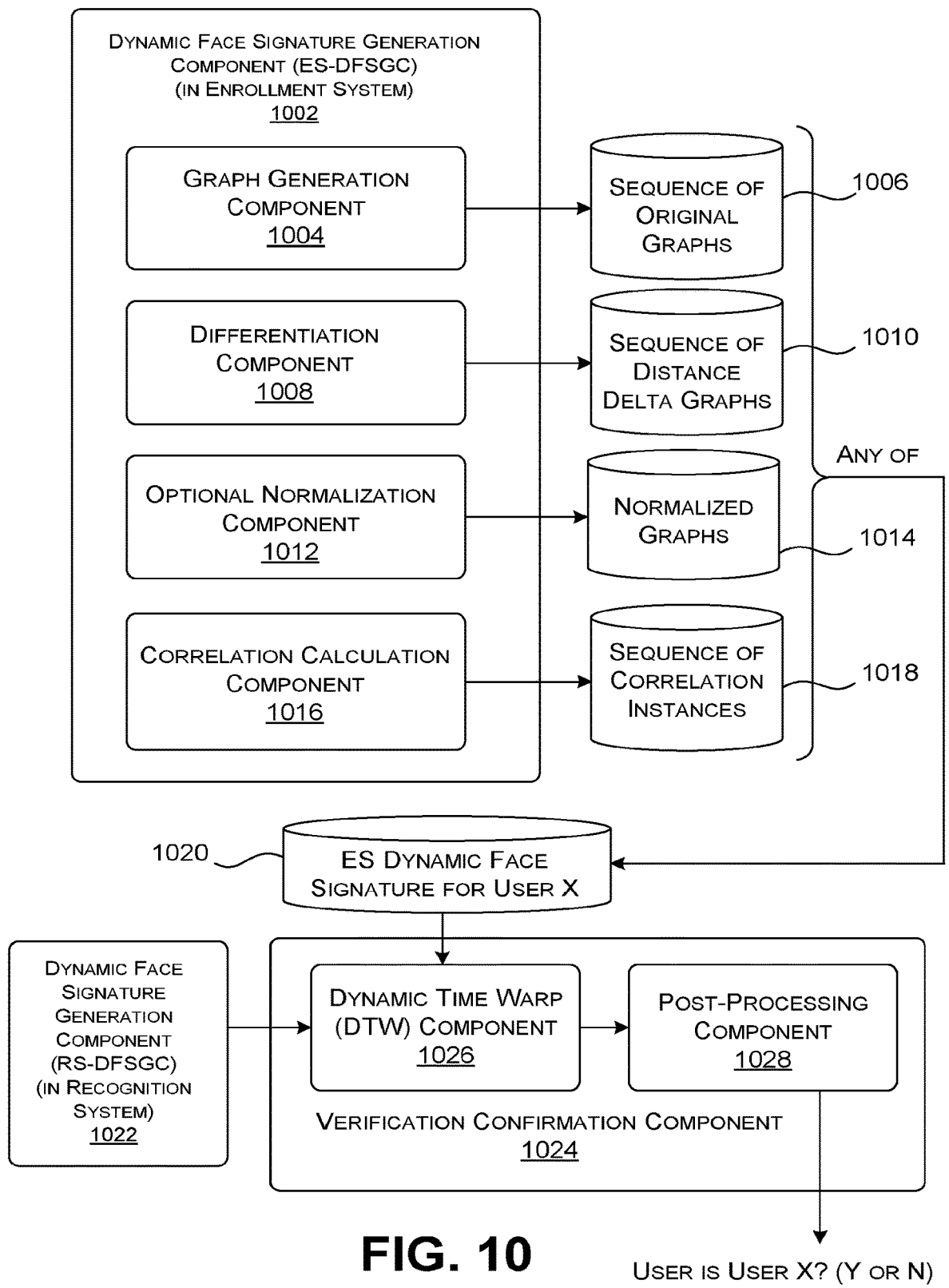
FIG. 10 shows a first implementation of parts of the system environment of FIG. 1. The first implementation uses a Dynamic Time Warping (DTW) technique to compare dynamic face signatures.

FIG. 10 shows a first implementation of parts of the system environment 102 of FIG. 1. The first implementation uses dynamic time warping to compare a stored ES dynamic face signature with a verification-phase RS dynamic face signature. This subsection will explain FIG. 10 in conjunction with the simplified example of FIG. 11.

An ES dynamic face signature generation component (ES-DFSGC) 1002 operates in the enrollment system 104 to generate an ES dynamic face signature based on the ES signature information. To do so, a graph generation component 1004 first generates original graph information that is made up of a sequence of original graphs, where each such original graph constitutes a separate instance of the original graph information. The graph generation component 1004 stores the original graph information in a data store 1006.

Figure 11:
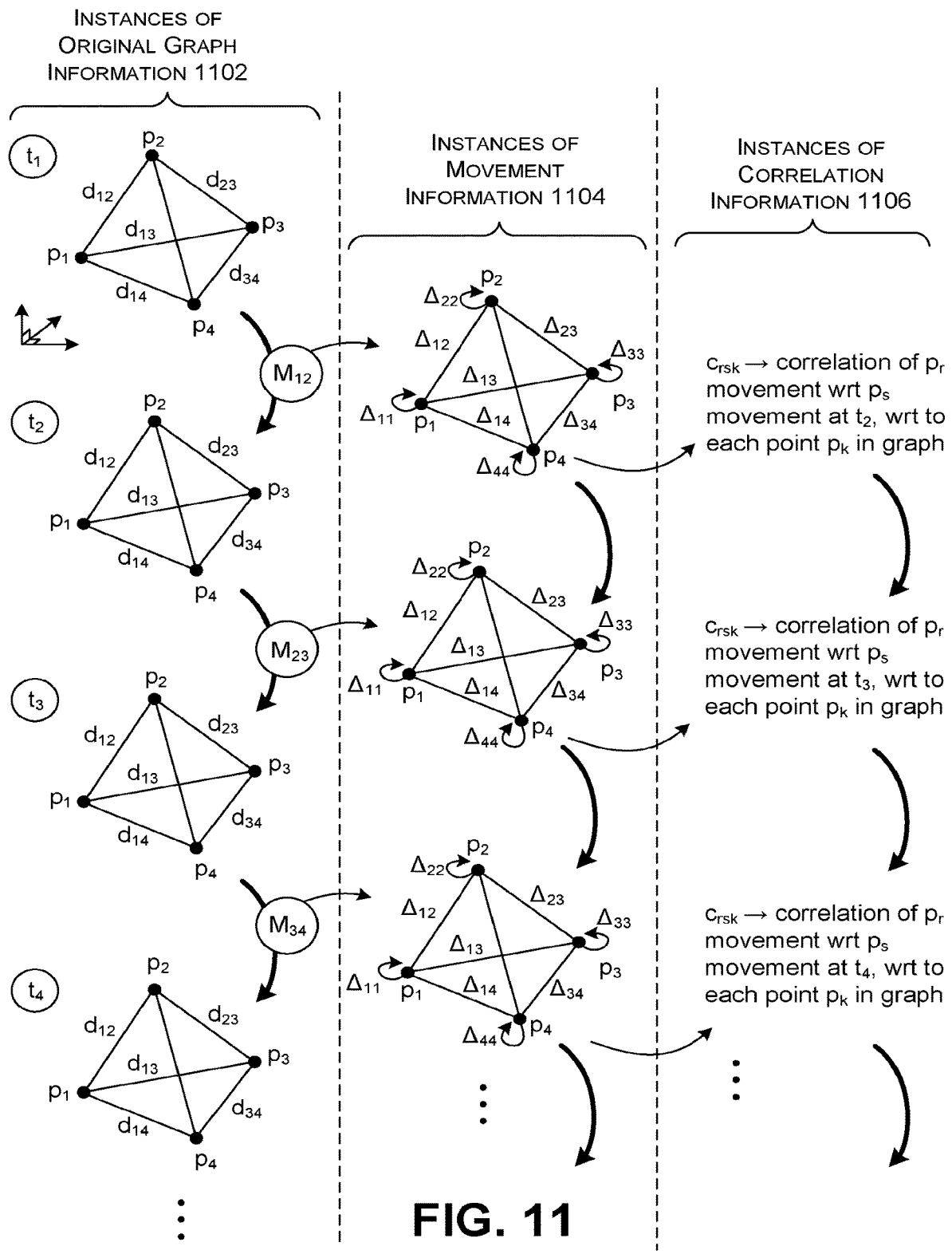
FIG. 11 shows information produced by the first implementation of FIG. 10. The first implementation produces a dynamic face signature based on one or more parts of the information shown in FIG. 11.

For example, the graph generation component 1004 can create the sequence of original graphs shown in the right-hand column 1102 of FIG. 11. Each such original graph describes the feature points generated by the feature extraction component 604 (of FIG. 6) for a particular frame of ES face information, captured at a particular time (e.g., $t_1$) during the course of the gesture.

Consider the original graph associated with time $t_1$. That original graph includes four feature points ($p_1$, $p_2$, $p_3$, $p_4$) generated by the feature extraction component 604. But note that FIG. 11 presents a highly simplified example; hence, the four feature points should be viewed as only part of a much larger original graph (not shown), including many more feature points. The original graph also shows links (edges) connecting each pair of points, such as a first link connecting points $p_1$ and $p_2$, a second link connecting point $p_1$ and $p_3$, etc. Finally, the original graph identifies the relative distance between each pairs of points. For example, the original graph indicates that the distance between points $p_1$ and $p_2$ is $d_{12}$.

The graph generation component 1004 can optionally store the information associated with each original graph without reference to a fixed frame of reference, such as without reference to fixed Cartesian x, y, and z axes. For instance, the graph generation component 1004 can store a distance table for each graph at each instance of time. That table can provide a row for each feature point ($p_r$) in the original graph. Each column entry for that row describes the distance between the particular feature point ($p_r$) associated with the row and another feature point $p_s$, e.g., $\|p_r\text{-}p_s\|$. For example, the row for the feature point $p_1$ includes the distance entries $\{\|p_1\text{-}p_1\|, \|p_1\text{-}p_2\|, \|p_1\text{-}p_3\|, \|p_1\text{-}p_4\|\}$, where the $p_r\text{-}p_r$ entry is always 0. By storing the original graph information in this relative manner, the graph generation component 1004 can efficiently add and remove points and edges to an original graph. But in another implementation, the graph generation component 1004 can store the original graph information with respect to a common frame of reference.

Returning to FIG. 10, a differentiation component 1008 generates movement information that is made up of a plurality of instances of movement information. Each such instance of movement information describes the transition of feature points between an original graph at time $t_i$ to an original graph at a next instance of time, $t_{i+1}$. The differentiation component 1008 can store the movement information in a data store 1010.

For instance, the differentiation component 1008 can create the sequence of distance delta graphs shown in the middle column 1104 of FIG. 11. Each such distance delta graph shows the four feature points described above. Each edge of each distance delta graph shows the change in relative distance between two corresponding points, from time $t_i$ to time $t_{i+1}$.

More specifically, consider the instance of movement information $M_{12}$ that describes the change in distances between the original graph at time $t_1$ and the original graph at time $t_2$. The edge connecting the points $p_1$ and $p_2$ bears the label $\Delta_{12}$, which describes the change in relative distance between points $p_1$ and $p_2$ over the transition from time $t_1$ to time $t_2$.

The differentiation component 1008 can optionally store each instance of movement information (associated with a corresponding distance delta graph) as a distance delta table that provides relative distance information in the manner described above, without the use of a fixed frame of reference. For instance, the table can include a row for each point $p_r$ in the distance delta graph that describes delta values for each edge connected to point $p_r$. Each row forms a vector associated with the point $p_r$.

Alternatively, or in addition, the differentiation component 1008 can store a simplified representation of each vector associated with each point $p_r$. For example, the differentiation component 1008 can store a magnitude value which represents the L2 norm of the vector. In addition, the differentiation component 1008 can also store a binary sign value (positive or negative) which reflects the movement of the point $p_r$ relative to some reference point, such as a centroid defined by all the points connected to point $p_r$. The sign value depends on whether the point $p_r$ moves towards or away from the centroid; if the point $p_r$ moves toward the centroid, the sign is negative, whereas if the point $p_r$ moves away from the centroid, the sign is positive.

Returning to FIG. 10, an optional normalization component can produce normalized graph information for storage in a data store 1014. In one implementation, the normalization component 1012 normalizes the distance information in the original graph. In another implementation, the normalization component 1012 normalizes the delta values in the distance delta graphs.

Consider the case in which the normalization component 1012 normalizes the delta values. For example, consider the particular case of the delta value $\Delta_{12}$ between points $p_1$ and $p_2$. The normalization component 1012 can identify the maximum value of $\Delta_{12}$ over the course of all instances of time ($t_i$) in the gesture. Assume that the maximum value is $\Delta_{max}$. The normalization component 1012 can then divide each occurrence of $\Delta_{12}$ in each distance delta graph by $\Delta_{max}$ to provide a normalized version of this distance delta value. The normalization component 1012 can perform the same operation on each distance delta value $\Delta_{rs}$ associated with each pairing of connected points, $p_r$ and $p_s$. By performing this normalization, the ES-DFSGC 1002 can more effectively compare the manner in which a first pair of points changes relative to a second pair of points.

As noted above, each vector associated with a point $p_r$ in a distance delta graph can alternatively be expressed as just a magnitude. In that case, the normalization component 1012 can convert the single value for $p_r$ to a value between 0 and 1. When the vector is expressed as both a magnitude and a sign, the normalization component 1012 can express the value for $p_r$ as a value between −1 and 1.

A correlation calculation component 1016 provides correlation information that describes the correlation between the movements associated with each pair of points, with respect to each distance delta graph, or a normalized counterpart thereof. The correlation calculation component 1016 stores the correlation information, which is made up of a plurality of instances of correlation information, in a data store 1018. FIG. 11 shows, in the right-most column 1106, a plurality of such instances of correlation information, associated with respective distance delta graphs in column 1104.

For example, consider the distance delta graph that describes the change in distances between times $t_1$ and $t_2$ (corresponding to the instance of movement information $M_{12}$). That instance of movement information describes the correlation between each pair of points ($p_r$, $p_s$) in the distance delta graph for $M_{12}$, with respect to the movement of these points ($p_r$, $p_s$) relative to another point $p_k$ in the distance delta graph. For example, consider the correlation $C_{12}$ in that graph between the points $p_1$ and $p_2$. In one implementation, the correlation has multiple dimensions ($c_{rsk}$) because each of the points ($p_1$ and $p_2$) moves in relation to other points in the distance delta graph. For instance, the correlation $C_{12}$ has a first component $c_{123}$ that describes the extent to which the movement of the point $p_1$ is correlated with the movement of the point $p_2$, with respect to the point $p_3$. The correlation $C_{12}$ has another component $c_{124}$ that describes the extent to which the movement of the point $p_1$ is correlated with the movement of the point $p_2$, with respect to the point $p_4$, and so on. The correlation calculation component 1016 can generate a measure of correlation between two points using any metric(s), such as by using a co-variance measure. For instance, in one implementation, co-variance can be measured in a binary manner. For example, the component $c_{123}$ can be assigned a first value (e.g., 1) when the points $p_1$ and $p_2$ move in the same way with respect to point $p_3$; the component $c_{123}$ has a second value (e.g., 0) when the points $p_1$ and $p_2$ move in different respective ways with respect to the point $p_3$. Different implementations can use different environment-specific thresholds to quantify what constitutes movement in the "same way."

In another case, each point in each distance delta graph is reduced to a magnitude and a sign (or just a magnitude) in the manner described above. In this case, the correlation calculation component 1016 perform correlation between two points (e.g., $p_1$ and $p_2$) by processing two scalar values associated with the respective points.

In the examples described above, the correlation calculation component 1016 provides an instance of correlation information for each pair of points, and for each distance delta graph. In addition, or alternatively, the correlation calculation component 1016 can generate an instance of correlation information for each pair of points that describes the correlation between those two points across an entire sequence of distance delta graphs. Again, the correlation calculation component 1016 can generate a measure of correlation between two points using any metric(s), such as by using a co-variance measure.

Although not shown, the ES-DFSGC 1002 can optionally include a pruning component. The pruning component can optionally remove edges and/or points in each distance delta graph (or a normalized version thereof) that fail to meet prescribed significance-related criteria. For instance, the pruning component can remove an edge between two points when that edge represents no correlation or only a weak correlation, e.g., meaning that there is no (or only weak) correlation between the movement of the two points.

The ES-DFSGC 1002 can generate the dynamic face signature by culling any of the above-described information from the data stores (1006, 1010, 1014, 1018). For instance, in one implementation, the ES-DFSGC 1002 generates the ES dynamic face signature by describing the sequence of the original graphs. Alternatively, or in addition, the ES-DFSGC 1002 provides the ES dynamic face signature by describing the sequence of distance delta graphs (which can be optionally normalized and/or pruned in the manner described above). Alternatively, or in addition, the ES-DFSGC 1002 provides the ES dynamic face signature by providing a plurality of instances of correlation information computed at different points over the gesture, and so on. In whatever manner calculated, the ES-DFSGC 1002 stores the dynamic face signature in a data store 1020.

Now referring to the verification phase of the processing, a verification-phase RS-DFSGC 1022 processes RS face information to generate a verification-phase RS dynamic face signature. To do so, it performs the same processing described above with reference to the ES-DFSGC 1002, but, in this case, by operating on the RS face information.

A verification confirmation component 1024 compares the RS dynamic face signature with the ES dynamic face signature provided in the data store 1020. In one case, the verification confirmation component 1024 uses a dynamic time warp (DTW) component 1026 to perform this comparison, which uses the dynamic time warping (DTW) technique. From a high level perspective, the DTW component 1026 aligns matching portions across two gestures, effectively removing temporal variations between the two gestures. The DTW component 1026 thereby accounts for the case in which the user performs the same gesture on different occasions at respective different speeds. Further, the DTW component 1026 accounts for the case in which the user speeds up and/or slows down during the execution of a single gesture, relative to the user's execution of the gesture on a prior occasion.

In one implementation, the DTW technique aligns the elements of two sequences X and Y by producing a cost matrix. Each entry in the cost matrix describes a local cost value c, describing the similarity between a particular element ($x_g$) of X and a particular element ($y_h$) of Y. A pair of elements that is assessed as similar has a low local cost. The DTW technique then finds a path through the cost matrix that has minimum overall cost. The DTW technique can find this path using, for instance, dynamic programming. The path defines an optimal alignment of the sequence X and the sequence Y.

Next, the DTW component 1026 can generate a measure which quantifies an extent to which the ES dynamic face signature matches the RS dynamic face signature. The DTW component 1026 can use any strategy to perform this comparison. For example, the DTW component 1026 can use a machine-trained statistical model to generate a confidence score that describes the similarity between the ES dynamic face signature and the RS dynamic face signature.

Finally, a post-processing component 1028 generates a final indication of whether the RS dynamic face signature matches the ES dynamic face signature. For instance, the post-processing component 1028 can compare the confidence score generated by the DTW component 1026 with an environment-specific threshold value. If the confidence score is above the threshold value, the post-processing component 1028 indicates that a match has occurred.

A.3. Graph Processing Implementation

Figure 12:
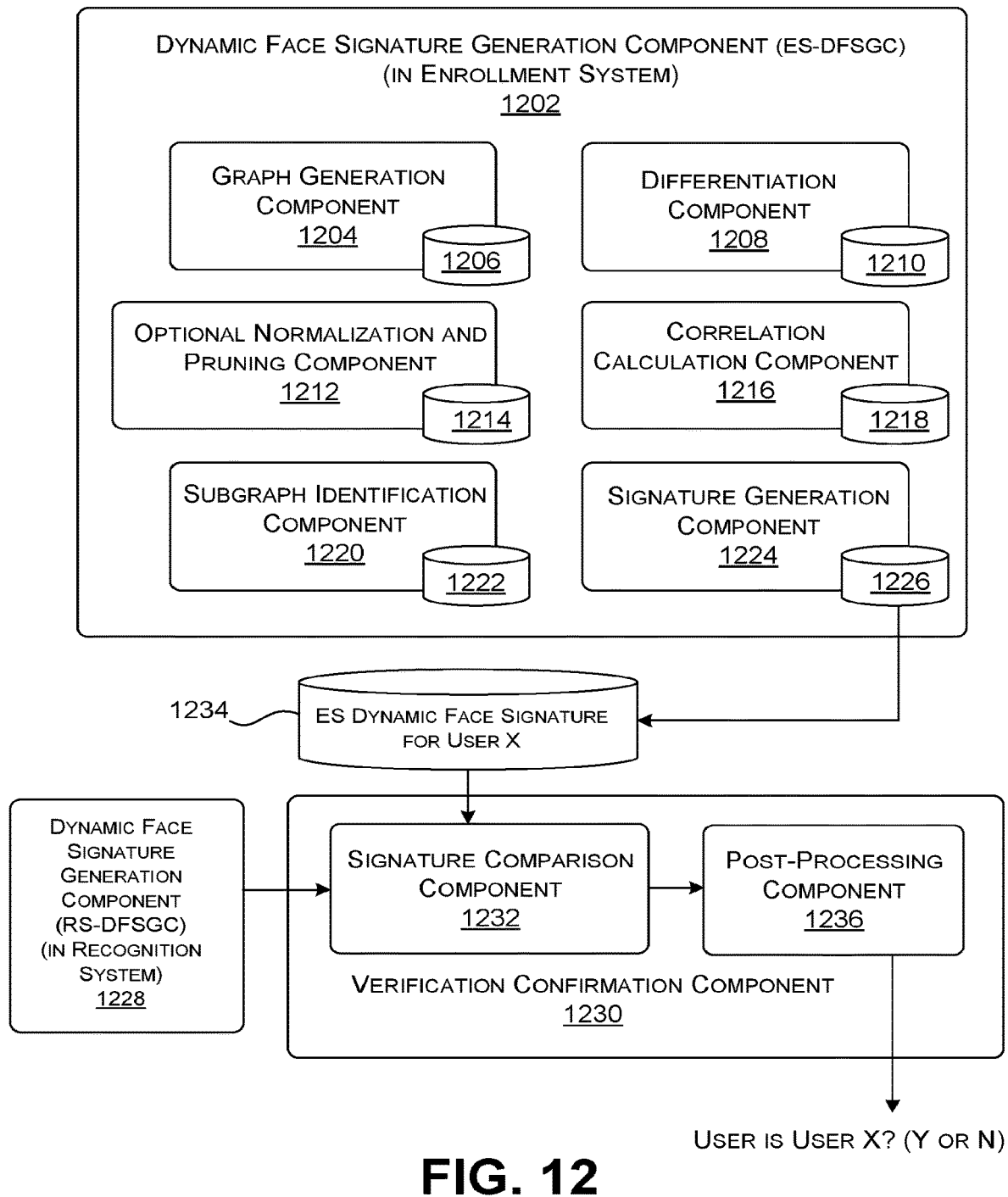
FIG. 12 shows a second implementation of parts of the system environment of FIG. 1. The second implementation identifies subgraphs of feature points that move in a consistent manner with respect to other feature points, and uses those subgraphs to construct a dynamic face signature.

FIG. 12 shows a second implementation of parts of the system environment 102 of FIG. 1. The second implementation identifies subgraphs of feature points that move in a consistent manner (e.g., a same manner) with respect to other feature points (with respect to any environment-specific threshold that defines consistency), and uses those subgraphs to construct a dynamic face signature. FIG. 12 will be explained below in conjunction with the examples of FIGS. 13 and 14.

An ES-DFSGC 1202 operates in the enrollment system 104 to generate an ES dynamic face signature based on the ES face information. The ES-DFSGC 1202 includes many of the same components as the ES-DFSGC 1002 described in Subsection A.2, including a graph generation component 1204 that generates original graph information for storage in a data store 1206, a differentiation component 1208 that generates movement information for storage in a data store 1210, an optional normalization and pruning component 1212 for generating normalized and pruned graph information for storage in a data store 1214, and a correlation calculation component 1216 that generates correlation information for storage in a data store 1218.

A subgraph identification component 1220 identifies one or more subgraphs, each of which includes a collection of feature points which move in generally the same manner with respect to other points. Overall, the subgraph identification component 1220 generates subgraph information for storage in a data store 1222.

Finally, a signature generation component 1224 generates an ES dynamic face signature based principally on the subgraph information provided by the subgraph identification component 1220. The signature generation component 1224 stores the ES dynamic face signature in a data store 1226.

In one illustrative concrete case, with reference to FIG. 8, the ES-DFSGC 1202 can conclude that the points associated with arrow "a" and arrow "b" form a subgraph that moves in a consistent manner (e.g., a same manner) from frame to frame. Likewise, the ES-DFSGC 1202 can conclude that the points associated with arrow "c" and arrow "d" form another subgraph that moves in a consistent manner from frame to frame.

Figure 13:
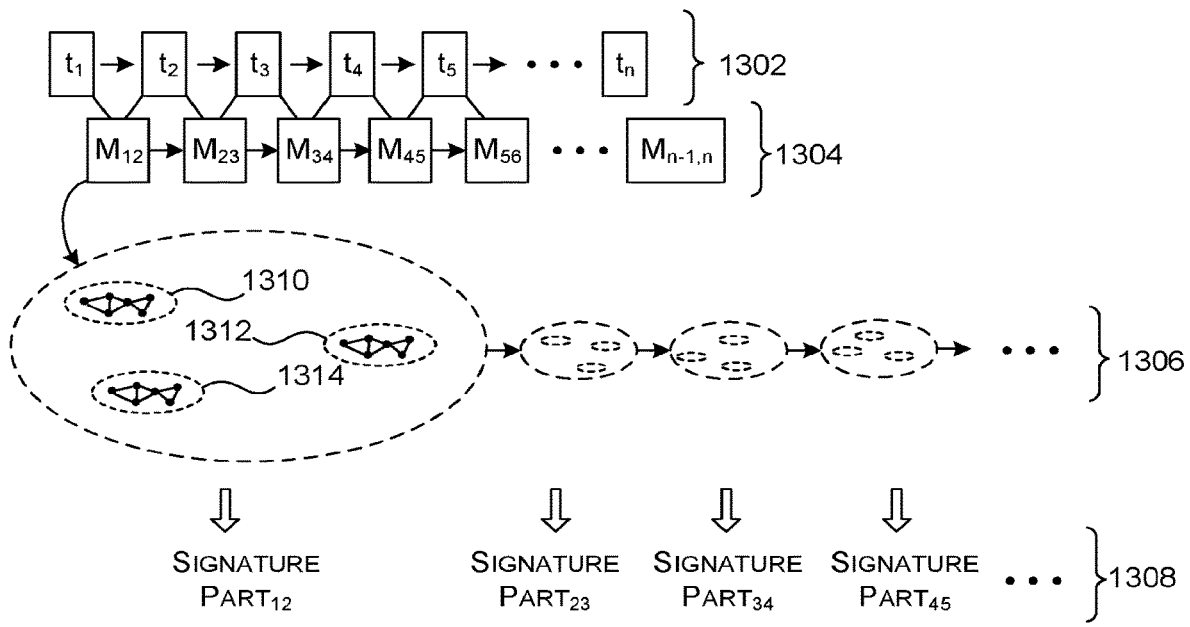
FIGS. 13 and 14 show two examples of the operation of the implementation of FIG. 12.

FIG. 13 shows a first manner of operation of the ES-DFSGC 1202 of FIG. 12. As indicated there, the graph generation component 1204 generates a plurality of original graphs 1302 associated with respective instances of time ($t_1$, $t_2$, ... $t_n$) across the gesture. The differentiation component 1208 then generates a plurality of instances of movement information 1304 that express movement of feature points between pairs of temporally adjacent original graphs. The instances of movement information 1304 correspond to respective distance delta graphs. The subgraph component 1220 generates a plurality of instances of subgraph information 1306 based on the instances of motion information in conjunction with respective instances of correlation information (not shown). And finally, the signature generation component 1224 generates a plurality of signature parts 1308 based on the subgraph information, which collectively make up the ES dynamic face signature.

More specifically, consider the generation of a first signature part ($part_{12}$) in the collection of signature parts. To generate this part, the subgraph identification component 1220 examines the correlation among feature points within the delta distance graph for $M_{12}$, as revealed by a corresponding instance of correlation information. In the representative case of FIG. 13, the subgraph identification component identifies subgraphs 1310, 1312, and 1314, which occur within the more encompassing distance delta graph (not shown). Finally, the signature generation component 1224 generates the $part_{12}$ by describing the identified subgraphs (1310, 1312, 1314). The ES-DFSGC 1202 performs this same processing to generate each part of the ES dynamic face signature.

The subgraph identification component 1220 can identify subgraphs in different ways. In one case, the subgraph identification component 1220 identifies a subgraph when it finds a collection of points that: (a) form a maximum clique; and (b) move in a consistent manner (e.g., a same manner) with respect to other feature points. A clique includes a subset of feature points that forms a complete subgraph. The subgraph identification component 1220 can use any algorithm for detecting a maximum clique, such as, without limitation, the Bron-Kerbosch algorithm which uses recursive backtracking. The subgraph identification component 1220 can define what constitutes movement in a consistent manner with respect to any metric(s), such as a co-variance metric, and with respect to any environment-specific threshold(s). The signature generation component 1224 can describe a subgraph in any manner, such as by describing the feature points and edges included within the subgraph.

Figure 14:
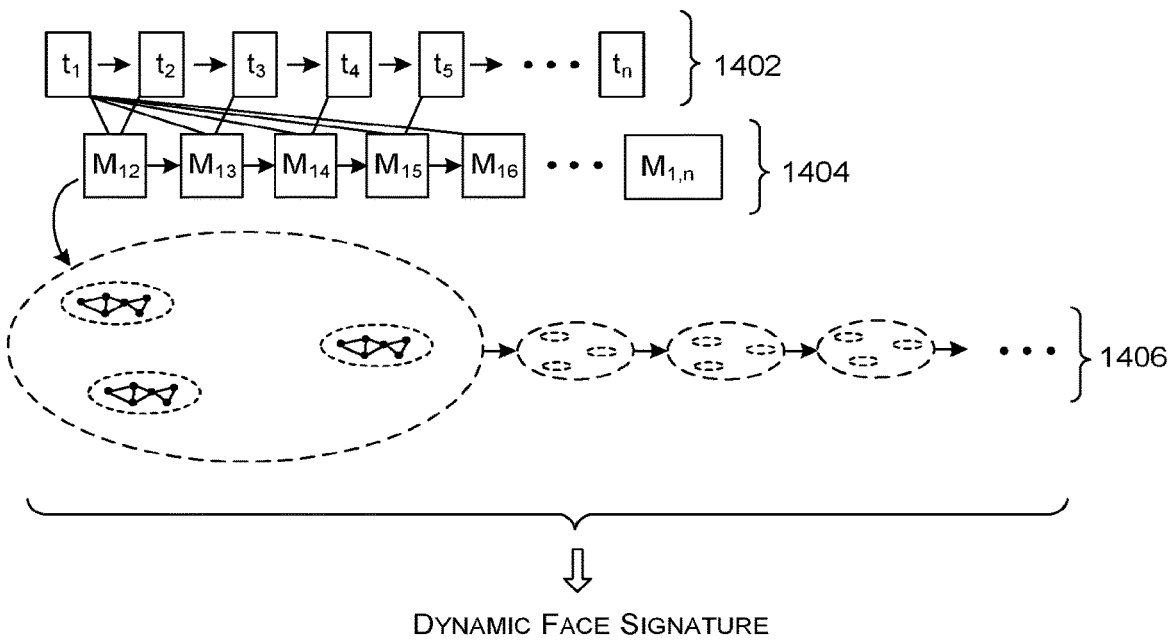

FIG. 14 shows a second manner of operation of the ES-DFSGC 1202 of FIG. 12. As shown there, the graph generation component 1204 again generates a plurality of original graphs 1402 associated with respective instances of time across the gesture. The differentiation component 1208 then generates a plurality of instances of movement information 1404 that express movement of feature points between pairs of original graphs. The instances of movement information 1404 correspond to respective distance delta graphs. But in this example, each distance delta graph describes the movement between a common original graph (e.g., corresponding to the original graph for $t_1$) and another original graph. Hence, in this case, the distance delta graph need not compare temporally adjacent original graphs. For example, the distance delta graph for $M_{15}$ describes the movement of feature points from the original graph associated with time $t_1$ to the original graph associated with time $t_5$. The subgraph identification component 1220 generates a plurality of instances of subgraph information 1406 based on the respective delta distance graphs. And finally, the signature generation component 1224 generates an ES dynamic face signature based on the subgraph information.

In the example of FIG. 14, the signature generation component 1224 can generate an ES dynamic face signature which summarizes the subgraphs over the entire gesture. For example, the signature generation component 1224 can identify subgraphs that behave in a consistent manner (relative to other feature points) across the entire gesture, with respect to any metric(s) of similarity and with respect to any environment-specific threshold(s). The signature generation component 1224 can then generate a description of this consistent movement for use in the ES dynamic signature. For example, assume that the signature generation component 1224 identifies that a subgraph G, composed of a set of points, moves together through most of a gesture in a uniform manner, as when the user raises and lowers his eyebrows through the gesture. The signature generation component 1224 can describe that subgraph by specifying its points and edges. It can also provide summary information which describes how the subgraph G moves, e.g., by averaging the delta values associated with the subgraph G over the course of the gesture.

Referring now to the recognition phase of FIG. 12, an RS-DFSGC 1228 generates an RS dynamic signature in the same manner described above, but here with respect to the captured RS face information (not the ES face information). A verification confirmation component 1230 uses a signature comparison component 1232 to compare the RS dynamic face signature with the RS dynamic face signature stored in a data store 1234, to produce a confidence value. The signature comparison component 1232, for instance, can use a machine-trained statistical model to perform the comparison. A post-processing component 1236 determines whether the confidence value satisfies a prescribed environment-specific threshold, indicating that the RS face information is a match for the presented user X.

A.4. Neural Network Implementation

Figure 15:
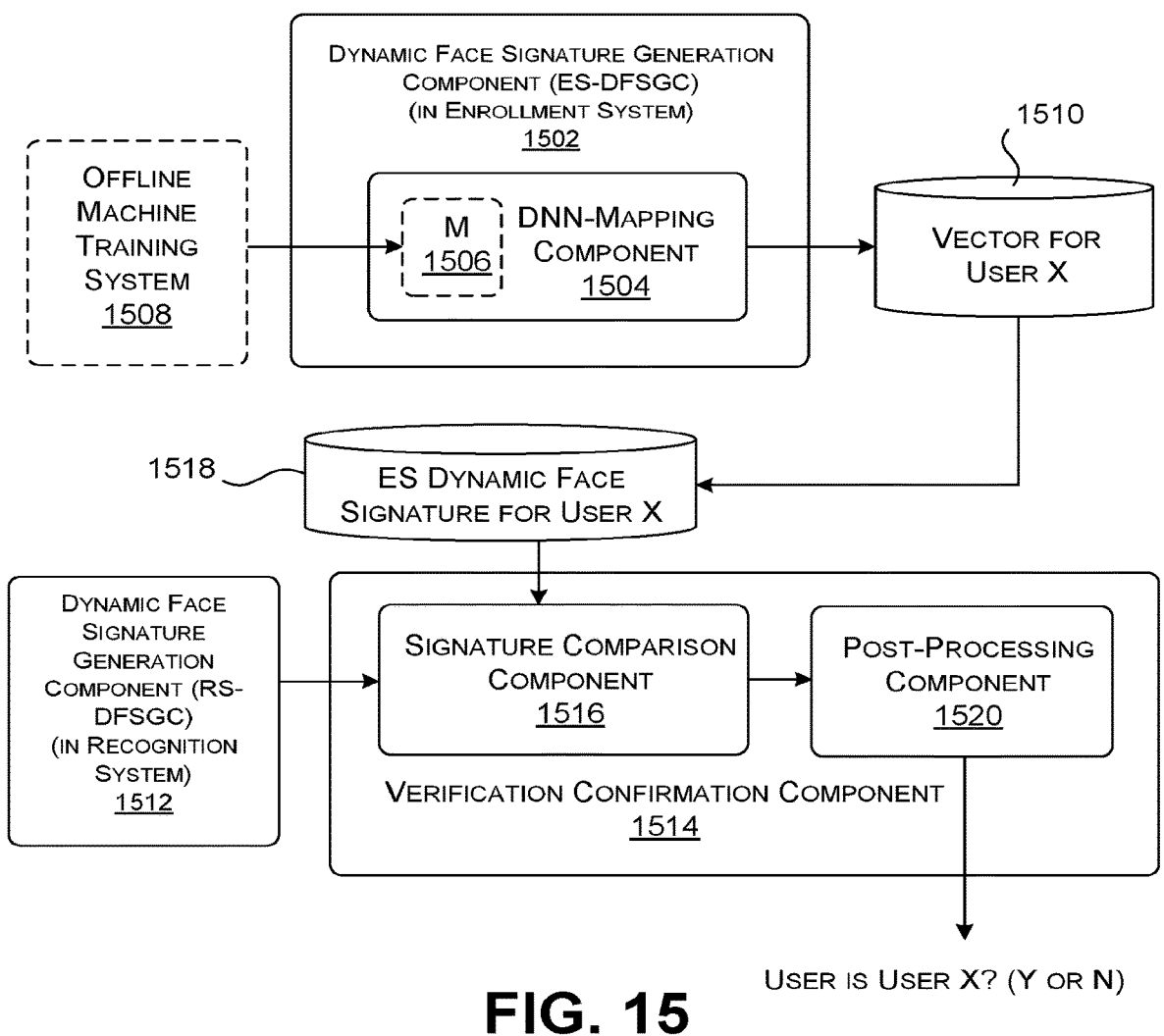
FIG. 15 shows a third implementation of parts of the system environment of FIG. 1. The third implementation uses a deep-learning neural network to generate and process dynamic face signatures

FIG. 15 shows a third implementation of parts of the system environment of FIG. 1. The third implementation uses a deep-learning neural network to generate and process dynamic face signatures.

More specifically, an ES-DFSGC 1502 operates in the enrollment system 104 to generate an ES dynamic face signature. To do so, the ES-DFSGC 1502 uses a deep-learning neural network mapping component 1504 ("DNN-mapping component") to map the ES face information into a vector in a high-level semantic space. That vector constitutes the ES dynamic face signature. To perform this mapping task, the DNN-mapping component 1504 uses a model 1506 (e.g., corresponding to set of weighting values) produced by an offline machine training system 1508.

In one case, the DNN-mapping component 1504 operates on the raw ES face information provided by the ES face information capture system 110. Alternatively, or in addition, the DNN-mapping component 1504 operates on the features extracted by the feature extraction component 604 of FIG. 6. Alternatively, or in addition, the DNN-mapping component 1504 can operate on any of the original graph information, movement information, and/or correlation information shown in FIG. 11. In any case, the DNN-mapping component 1504 can operate on an entire sequence of samples across the entire gesture, or some part thereof. The DNN-mapping component 1504 stores the vector that it produces in a data store 1510.

The model 1506 can include N layers of neurons that map an input vector $z_1$ into an output vector y. The input vector $z_1$ expresses any aspect of the ES face information described above. In a feed-forward architecture, the values in any layer j may be given by the formula, $z_j=f(W_j z_{j-1}+b_j)$, for $j=2, \ldots N$. The symbol $W_j$ denotes the j-th weight matrix produced by the training system 1508, and the symbol $b_j$ refers to an optional j-th bias vector, also produced by the training system 1508. The function $f(x)$, referred to as the activation function, can be formulated in different ways, such as the tanh function. The output vector y maps to a particular classification outcome.

In other cases, the model 1506 can include one or more convolution layers, one or more max-pooling layers, one or more recurrent neural network (RNN) layers, etc. In addition, or alternatively, the model 1506 can use any type of architecture that employs gates and/or memory cells. For example, in a Long-Short-Term-Memory (LSTM) architecture, the model 1506 can be constructed using a plurality of LSTM units. Each LSTM unit can use one or more gates to control the receipt of new information into the LSTM unit, one or more gates to control the retention of information in the LSTM unit, one or more gates to control the output of information from the LSTM unit, and so on. Convolutional layers, RNN layers, and LTSTM architectures are particularly useful in capturing relations among different parts of the ES face information.

Note that the DNN-mapping component 1504 is unlike the previous implementations in that it does not include a priori logic elements for identifying the kind of movement information and correlation information shown in FIG. 11. Rather, the training process generates weighting values that, when applied by the DNN-mapping component 1504, have the effect of identifying and expressing the movement information and correlation information.

The training algorithm (used by the training system 1508) can enhance the ability of the model 1506 to detect the material dynamics of a face through its selection of training criteria. For instance, the training algorithm can use criteria that assign rewards to edges that reveal coordinated movement, and assign penalties to edges that reveal independent movement. The training algorithm can also enhance the model's sensitivity to the material dynamics of a face by receiving input that emphasizes the movement information (rather than the pose-invariant features).

A verification-phase RS-DFSGC 1512 operates in the recognition system 106 to generate a verification-phase RS dynamic face signature. The RS-DFSGC 1512 uses the same technique as the above-described ES-DFSGC 1502, e.g., by using a DNN-mapping component to map RS face information into the RS dynamic face signature. The RS dynamic face signature constitutes a vector mapped into the same abstract semantic space as the ES dynamic face signature.

A verification confirmation component 1514 uses a signature comparison component 1516 to compare the RS dynamic face signature with the ES dynamic face signature (as stored in a data store 1518). In one case, the signature comparison component 1516 can perform this comparison by determining the distance between the RS dynamic face signature and the ES dynamic face signature using any vector-based distance metric, such as cosine similarity. A post-processing component 1520 determines whether the distance satisfies a prescribed threshold; if so, the post-processing component 1520 indicates that the RS dynamic face signature matches the ES dynamic face signature.

A.5. Hidden Markov Model Implementation

Figure 16:
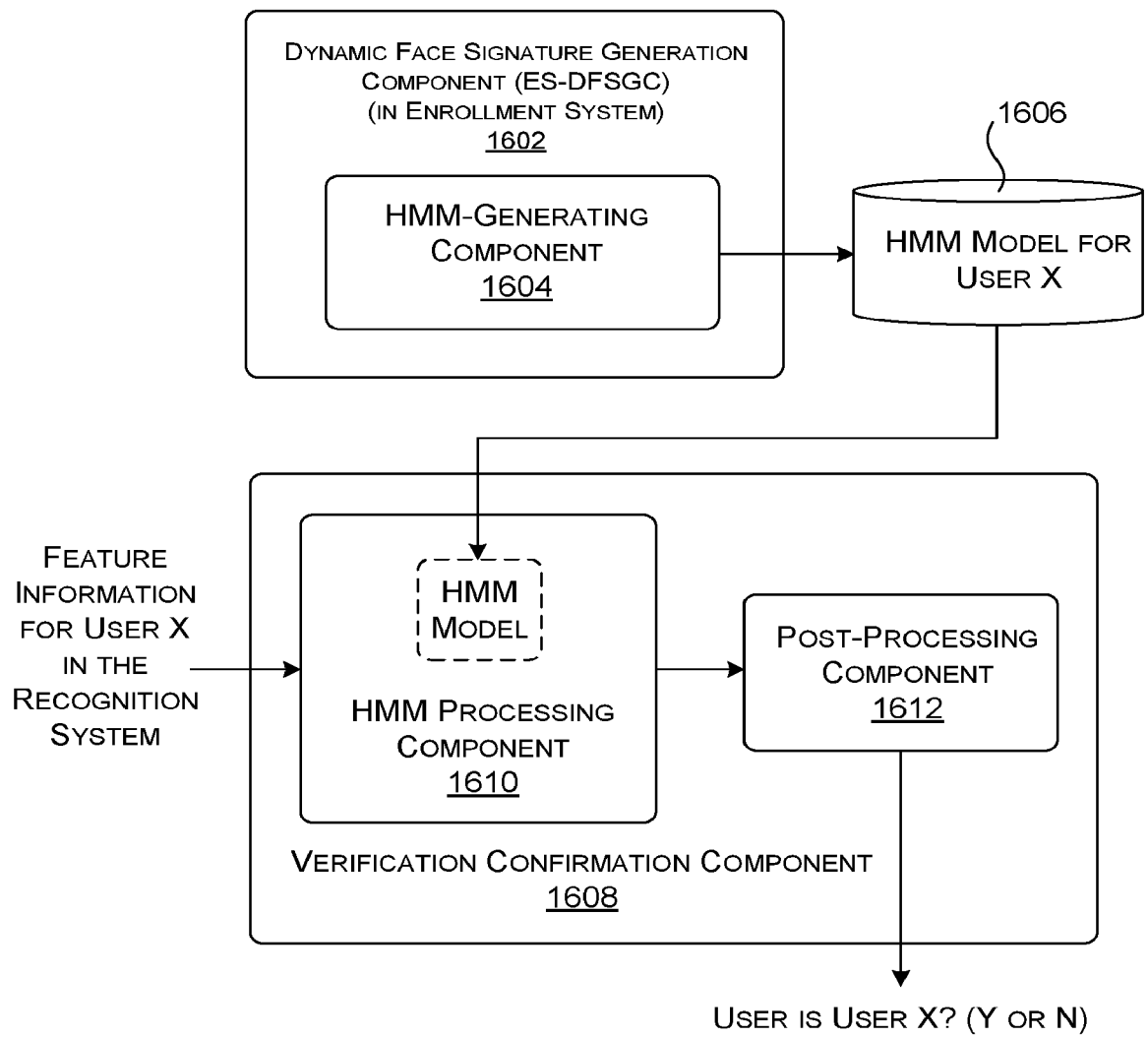
FIG. 16 shows a fourth implementation of parts of the system environment of FIG. 1. The fourth implementation uses a Hidden Markov Model (HMM) to generate and process dynamic face signatures.

FIG. 16 shows a fourth implementation of parts of the system environment 102 of FIG. 1. The fourth implementation uses Hidden Markov Model (HMM) processing to generate and process dynamic face signatures. General background information regarding Hidden Markov Models can be found in Lawrence R. Rabiner, "A Tutorial on Hidden Markov Models and Selected Applications in Speech Recognition," Proceedings of the IEEE, Vol. 77, No. 2, February 1989, pp. 257-286.

More specifically, an ES-DFSGC 1602 operates in the enrollment system 104 to generate an ES dynamic face signature. To do so, the ES-DFSGC 1602 uses an HMM-generating component 1604 to generate an HMM model for the user X based on the captured ES face information. More specifically, the ES-DFSGC 1602 can operate on the raw face information. Alternatively, or in addition, the ES-DFSGC 1602 can operate on features provided by the feature extraction component 604 of FIG. 6. Alternatively, or in addition, the ES-DFSGC 1602 can operate on any of the original graph information, movement information (e.g., like the movement information 1304 of FIG. 13 or the movement information 1404 of FIG. 14, etc.), correlation information (e.g., like the correlation information shown in FIG. 11), and so on. The HMM-generating component 1604 stores the HMM model in a data store 1606.

Like the case of the deep-learning network (in Subsection A.4), note that the HMM-generating component 1604 does not embody a priori rules for identifying the type of movement information and correlation information shown in FIG. 11. Rather, the HMM model is itself configured (through its weighting values) to reflect inherent movement information and correlation information in the captured ES information. The HMM-generating component 1604 can also enhance the HMI model's sensitivity to the material dynamics of a face by receiving input that emphasizes the movement information (rather than the pose-invariant features).

In the recognition system 106, a verification confirmation component 1608 uses an HMM processing component 1610 to process the RS face information (e.g., by processing features extracted from the RS face information). In doing so, the HMM processing component 1610 generates a confidence score that reflects the likelihood that the RS face information matches the HMM model (computed by the HMM-generating component 1604). A post-processing component 1612 determines whether the confidence score satisfies an environment-specific threshold value.

The above-described four implementations of the system environment 102 are set forth in the spirit of illustration, not limitation. Other implementations can use other strategies for detecting and expressing the manner in which points move over the course of a gesture. For example, other strategies can use other machine-learning approaches (e.g., besides the use of a deep-learning neural network or HMM), an optical flow approach, a clustering-based approach, and so on.

B. Illustrative Processes

Figure 17:
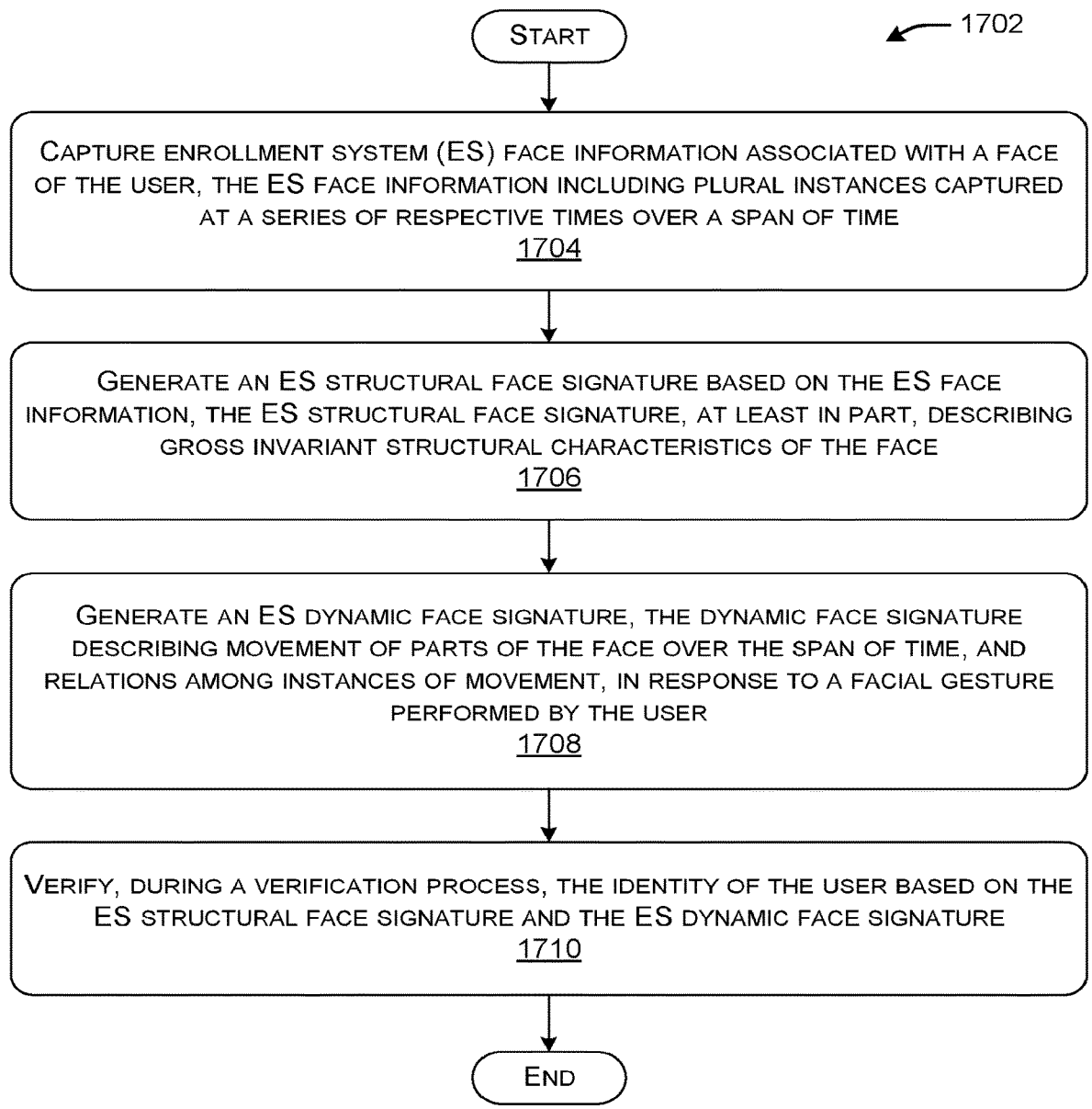
FIG. 17 shows a process that represents an overview of one manner of operation of the system environment of FIG. 1, emphasizing the role of the enrollment system.
Figure 18:
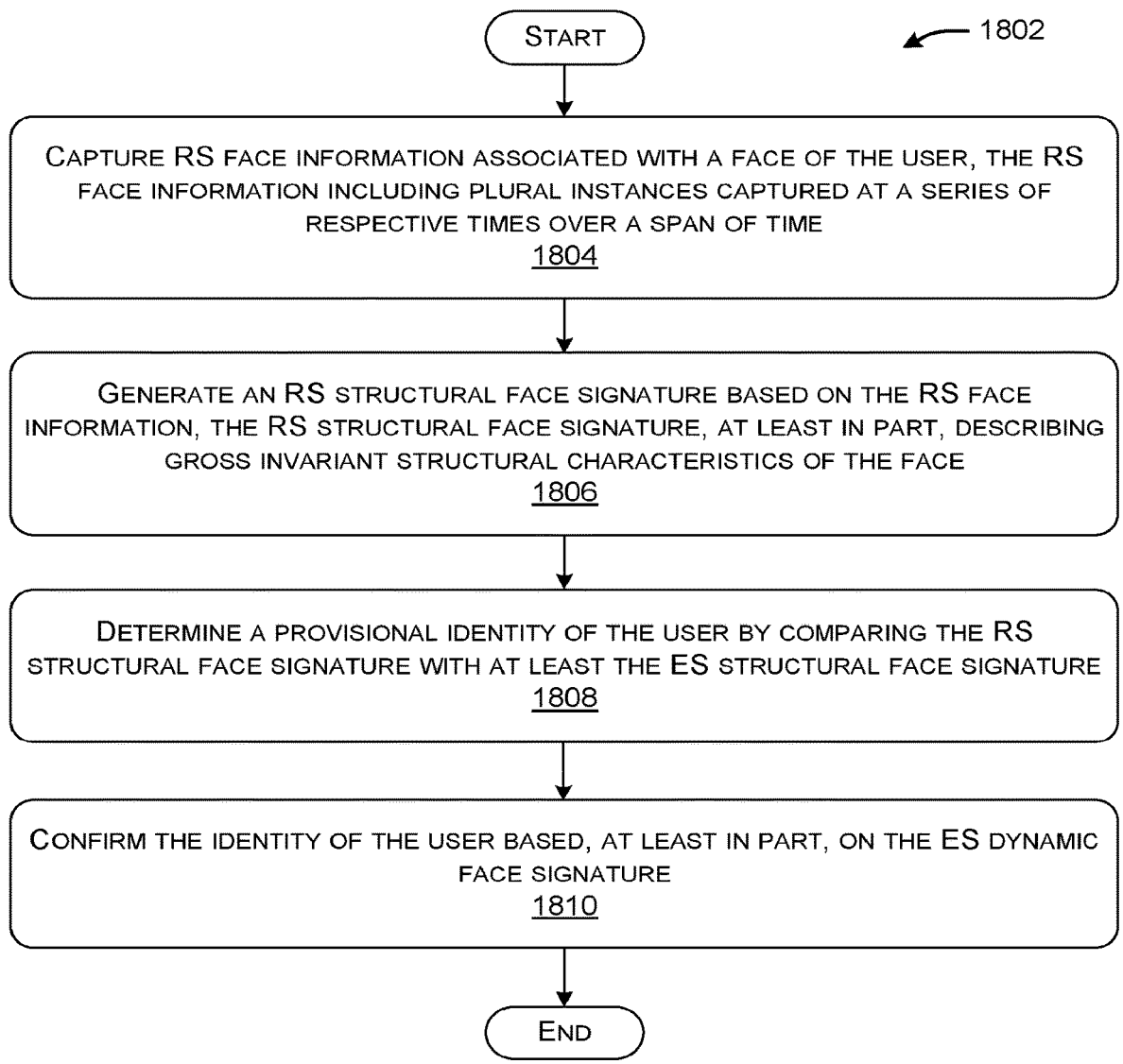
FIG. 18 shows a process that represents one manner of operation of the system environment of FIG. 1, emphasizing the role of the recognition system.

FIGS. 17 and 18 show processes (1702, 1802) that explain the operation of the system environment 102 of FIG. 1 in flowchart form. Since the principles underlying the operation of the system environment 102 have already been described in Section A, certain operations will be addressed in summary fashion in this section. As noted in the prefatory part of the Detailed Description, the flowcharts are expressed as a series of operations performed in a particular order. But the order of these operations is merely representative, and can be varied in any manner.

FIG. 17 shows a process 1702, implemented by one or more computing devices, for verifying the identity of a user. FIG. 17 is described from a perspective that emphasizes the role of the enrollment system 104. In block 1704, the system environment 102 captures enrollment system (ES) face information associated with a face of the user, the ES face information including plural instances of ES face information captured at a series of respective times over a span of time. In block 1706, the system environment 102 generates an ES structural face signature based on the ES face information. The ES structural face signature, at least in part, describes gross invariant structural characteristics of the face. In block 1708, the system environment 102 generates an ES dynamic face signature, the dynamic face signature describing movement of parts of the face over the span of time, and relations among instances of movement, in response to a facial gesture performed by the user. In block 1710, during a verification process, the system environment 102 identifies the user based on the ES structural face signature and the ES dynamic face signature.

FIG. 18 shows a process 1802 that explains the verification process associated with the block 1710 of FIG. 17. The system environment 102 performs the process 1802 using the recognition system 106. In block 1804, the system environment 102 captures RS face information associated with a face of the user, the RS face information including plural instances of RS face information captured at a series of respective times over a span of time. In block 1806, the system environment 102 generates an RS structural face signature based on the RS face information. The RS structural face signature, at least in part, describes gross invariant structural characteristics of the face. In block 1808, the system environment 102 determines a provisional identity of the user by comparing the RS structural face signature with at least the ES structural face signature. In block 1810, the system environment 1810 confirms the identity of the user based, at least in part, on the ES dynamic face signature.

C. Representative Computing Functionality

Figure 19:
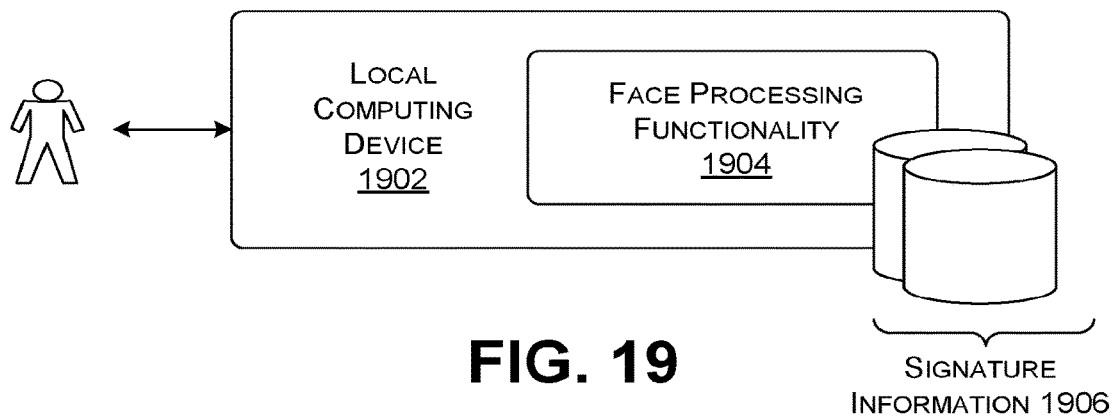
FIGS. 19 and 20 show two examples of computing equipment that can be used to implement at least parts of the system environment of FIG. 1

FIG. 19 shows at least one local computing device 1902 that can be used to implement any part of the system environment 102 of FIG. 1, such as any part of the enrollment system 104 and/or the recognition system 106. The local computing device 1902 may correspond, for instance, to any of: a stationary desktop computing device, a set-top box, a game console device, a tablet-type computing device, a smartphone, a media consumption device, a wearable computing device, and so on, or any combination thereof. FIG. 19 generically conveys that the local computing device 1902 may implement any part of the system environment 102 of FIG. 1 by indicating that it includes face processing functionality 1904, and has access to face signature information provided in one or more data stores 1906.

Figure 20:
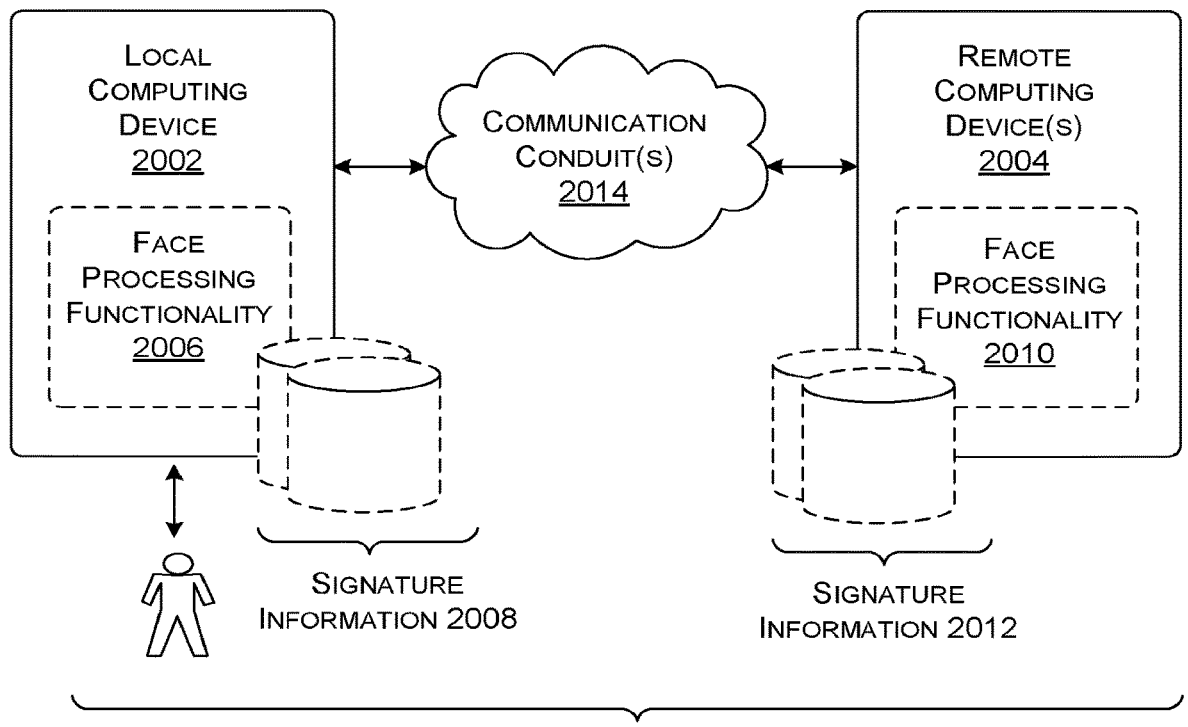

In another implementation shown in FIG. 20, at least one local computing device 2002 and one or more remote computing devices 2004 implements some or all of the functions of the system environment 102 of FIG. 1. The local computing device 2002 corresponds to any type of computing equipment described above with reference to FIG. 19. The remote computing device(s) may correspond to one or more server computing devices or the like, provided at a single location or distributed across multiple locations. FIG. 20 generically conveys that the local computing device 2002 can implement any part of the system environment 102 by indicating that it includes face processing functionality 2006, and has access to face signature information provided in one or more data stores 2008. FIG. 20 generically conveys that remote computing device(s) 2004 can implement any part of the system environment 102 by indicating that it includes face processing functionality 2010, and has access to face signature information provided in one or more data stores 2012.

One or more computer networks 2014 couple the local computing device 2002 to the remote computing device(s) 2004. The computer network(s) 2014 may correspond to a wide area network (e.g., the Internet), a local area network, etc., or combination thereof.

More specifically, in one implementation, the remote computing device(s) can provide a service which handles the storage of face signatures created by the system environment 102. The service can also optionally perform computationally intensive operations, such as the alignment of time-warped sequence as described in Subsection A.2., the computation of graph cliques as described in Subsection A.3, etc. One or more local computing devices (such as the local computing device 2002) of FIG. 20 can handle other aspects of the processing performed by the system environment 102.

Figure 21:
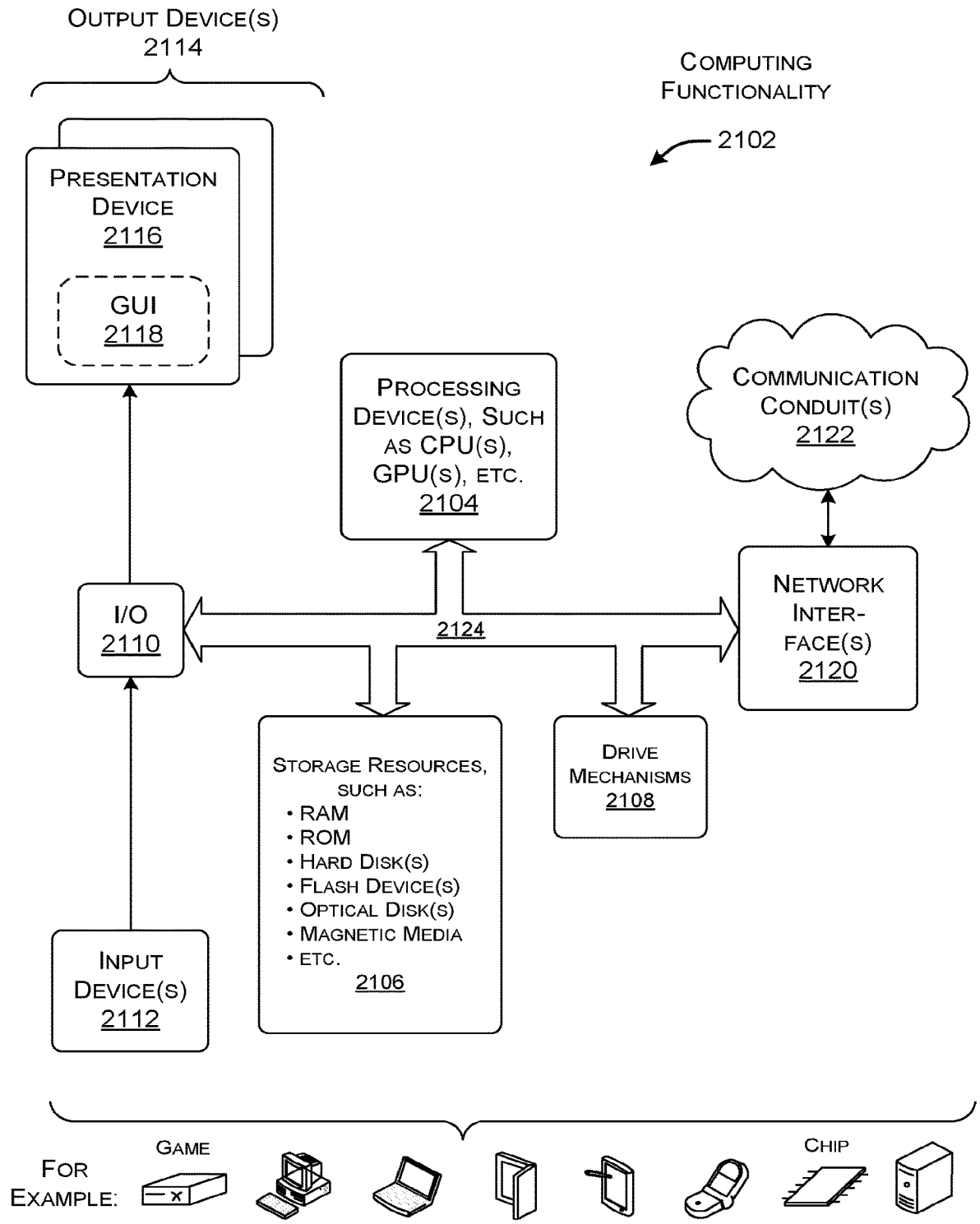
FIG. 21 shows illustrative computing functionality that can be used to implement any aspect of the features shown in the foregoing drawings.

FIG. 21 shows computing functionality 2102 that can be used to implement any aspect of the mechanisms set forth in the above-described figures. For instance, the type of computing functionality 2102 shown in FIG. 21 can be used to implement the local computing devices (1902, 2002) of FIGS. 19 and 20, and/or the remote computing device(s) 2004 of FIG. 20. In all cases, the computing functionality 2102 represents one or more physical and tangible processing mechanisms.

The computing functionality 2102 can include one or more hardware processor devices 2104, such as one or more central processing units (CPUs), and/or one or more graphical processing units (GPUs), and so on. The computing functionality 2102 can also include any storage resources (also referred to as computer-readable storage media or computer-readable storage medium devices) 2106 for storing any kind of information, such as machine-readable instructions, settings, data, etc. Without limitation, for instance, the storage resources 2106 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 2102. The computing functionality 2102 may perform any of the functions described above when the hardware processor device(s) 2104 carry out computer-readable instructions stored in any storage resource or combination of storage resources. For instance, the computing functionality 2102 may carry out computer-readable instructions to perform each block of the processes 1702 and 1802 described in Section B. The computing functionality 2102 also includes one or more drive mechanisms 2108 for interacting with any storage resource, such as a hard disk drive mechanism, an optical disk drive mechanism, and so on.

The computing functionality 2102 also includes an input/output component 2110 for receiving various inputs (via input devices 2112), and for providing various outputs (via output devices 2114). Illustrative input devices include a keyboard device, a mouse input device, a touchscreen input device, a digitizing pad, one or more video capture devices, one or more depth capture systems, one or more microphones, a voice recognition mechanism, any movement detection mechanisms (e.g., accelerometers, gyroscopes, etc.), and so on. One particular output mechanism may include a display device 2116 and an associated graphical user interface presentation (GUI) 2118. The display device 2116 may correspond to a charge-coupled display device, a cathode ray tube device, a projection mechanism, etc. Other output devices include one or more speakers, a haptic output mechanism, an archival mechanism, and so on. The computing functionality 2102 can also include one or more network interfaces 2120 for exchanging data with other devices via one or more communication conduits 2122. One or more communication buses 2124 communicatively couple the above-described components together.

The communication conduit(s) 2122 can be implemented in any manner, e.g., by a local area computer network, a wide area computer network (e.g., the Internet), point-to-point connections, etc., or any combination thereof. The communication conduit(s) 2122 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 2102 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a system environment is described, including one more computing devices, for verifying an identity of a user. The system environment includes an enrollment system (ES) and a recognition system (RS). The enrollment system includes: an ES face information capture system, having one or more capture devices, for capturing ES face information associated with a face of the user, the ES face information including plural instances of ES face information captured at a series of respective times over a span of time; a structure-based registration component configured to generate an ES structural face signature based on the ES face information, the ES structural face signature, at least in part, describing gross invariant structural characteristics of the face; and a dynamic registration component configured to generate an ES dynamic face signature, the dynamic face signature describing movement of parts of the face over the span of time, and relations among instances of movement, in response to a facial gesture performed by the user. The recognition system is configured to later authenticate the user based on the ES structural face signature and the ES dynamic face signature.

According to a second aspect, the recognition system (RS) further includes an RS management component configured to provide the user access to at least one resource upon confirming the identity of the user, and denying access to the resource(s) upon failing to confirm the identity of the user.

According to a third aspect, the ES dynamic face signature describes a gesture that involves movement of at least one structural feature of the face, and wherein the structure-based registration component is configured to provide a description of the structural feature(s).

According to a fourth aspect, the recognition system (RS) includes: an RS face information capture system, having one or more capture devices, for capturing RS face information associated with the face of the user, the RS face information including plural instances of RS face information captured at a series of respective times over a span of time; a structure-based recognition component configured to generate an RS structural face signature based on the RS face information, the RS structural face signature, at least in part, describing gross invariant structural characteristics of the face, and then determine a provisional identity of the user by comparing the RS structural face signature with at least the ES structural face signature; and a dynamic recognition component configured to confirm the identity of the user based, at least in part, on the ES dynamic face signature.

According to a fifth aspect, the dynamic recognition component is configured to: generate an RS dynamic signature based on the RS face information; and confirm the identity of the user by comparing the ES dynamic signature with the RS dynamic signature.

According to a sixth aspect, each ES or RS dynamic signature provides plural instances of movement information, each instance of movement information describing movement of feature points from a first instance of face information to a second instance of face information.

According to a seventh aspect, each ES or RS dynamic signature provides plural instances of correlation information, each instance of correlation information describing correlation of movements of features points, with respect to movement of feature points from a first instance of face information to a second instance of face information.

According to an eighth aspect, the dynamic recognition component is configured to compare the ES dynamic signature with the RS dynamic signature using dynamic time warping.

According to a ninth aspect, the dynamic registration system, alternatively, or in addition, uses a deep-learning neural network to generate the ES dynamic signature, and the dynamic recognition component uses a deep-learning neural network to confirm the identity of the user.

According to a tenth aspect, the dynamic registration component, alternatively, or in addition, uses Hidden Markov Model (HMM) processing to generate the ES dynamic signature, and the dynamic recognition component uses HMM processing to confirm the identity of the user.

According to an eleventh aspect, the dynamic registration component includes: a graph generation component configured to generate original graph information having plural instances, each instance of original graph information corresponding to an original graph, and each original graph describing feature points associated with an instance of face information, and distances between respective pairs of feature points; a differentiation component configured to generate movement information having plural instances, each instance of movement information corresponding to a distance delta graph, each distance delta graph describing movements of feature points from one original graph to another original graph; and a correlation component configured to generate correlation information having plural instances, each instance of correlation information describing correlations between the movements of features points with respect to a particular distance delta graph.

According to a twelfth aspect, the ES dynamic signature describes: the plural instances of original graph information; and/or the plural instances of movement information; and/or the plural instances of correlation information.

According to a thirteenth aspect, each distance delta graph is formed with respect to two temporally consecutive original graphs.

According to a fourteenth aspect, each distance delta graph is formed with respect to a reference original graph and one other original graph, a same reference original graph being used to generate all distance delta graphs.

According to a fifteenth aspect, the dynamic registration component further includes: a subgraph identification component configured to use the correlation information to identify one or more subgraphs associated with the ES face information, each subgraph including feature points which move in a consistent manner relative to other feature points; and a signature generation component configured to generate the ES dynamic signature based on subgraph information that describes the subgraph(s).

According to a sixteenth aspect, a method is described, implemented by one or more computing devices, for verifying an identity of a user. The method includes: capturing enrollment system (ES) face information associated with a face of the user using one or more capture devices, the ES face information including plural instances of ES face information captured at a series of respective times over a span of time; generating an ES structural face signature based on the ES face information, the ES structural face signature, at least in part, describing gross invariant structural characteristics of the face; generating an ES dynamic face signature, the dynamic face signature describing movement of parts of the face over the span of time, and relations among instances of movement, in response to a facial gesture performed by the user; and verifying, during a verification process, the identity of the user based on the ES structural face signature and the ES dynamic face signature.

According to a seventeenth aspect, the above-referenced verifying operation includes: capturing RS face information associated with a face of the user, the RS face information including plural instances of RS face information captured at a series of respective times over a span of time; generating an RS structural face signature based on the RS face information, the RS structural face signature, at least in part, describing gross invariant structural characteristics of the face; determining a provisional identity of the user by comparing the RS structural face signature with at least the ES structural face signature; and confirming the identity of the user based, at least in part, on the ES dynamic face signature.

According to an eighteenth aspect, one or more computing devices are described for recognizing a user. The computing device(s) include: a receiving component configured to receive captured recognition system (RS) face information associated with a face of the user, the RS face information including plural instances of RS face information captured at a series of respective times over a span of time, and the RS face information being provided by an RS face information capture system; a structure-based recognition component configured to generate an RS structural face signature based on the RS face information, the RS structural face signature, at least in part, describing gross invariant structural characteristics of the face, and determine a provisional identity of the user by comparing the RS structural face signature with at least one enrollment system (ES) structural face signature; and a dynamic recognition component configured to confirm the identity of the user based, at least in part, on an ES dynamic face signature associated with the user, where the ES dynamic face signature describes movement of parts of the face over the span of time, and relations among instances of movement, in response to a facial gesture performed by the user.

According to a nineteenth aspect, the dynamic recognition component (associated with the eighteenth aspect) is configured to confirm the identity of the user by: generating an RS dynamic signature based on the RS face information; and confirming the identity of the user by comparing the ES dynamic signature with the RS dynamic signature.

According to a twentieth aspect, the dynamic recognition component is configured to performing the comparing using dynamic time warping.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable storage medium storing instructions which, when executed by one or more hardware processors, cause the one or more hardware processors to:
   capture a first plurality of frames of a face of a user at a first series of times during which the user performs a gesture that moves at least a portion of the face;
   generate a first structural signature based at least on one of the first plurality of frames, the first structural signature describing a pose-invariant characteristic of the face that does not vary from pose to pose;
   generate a first dynamic signature based at least on the first plurality of frames, the first dynamic signature describing:
      positions of points on the face in the first plurality of frames;
      distances between the points in the first plurality of frames; and
      deltas reflecting changes in the distances between the points through the first plurality of frames;
   store the first structural signature and the first dynamic signature;
   capture a second plurality of frames of the face of the user at a second series of times during which the user performs the gesture that moves at least the portion of the face;
   generate a second structural signature based at least on one of the second plurality of frames, the second structural signature describing the pose-invariant characteristic of the face that does not vary from pose to pose; and
   generate a second dynamic signature based at least on the second plurality of frames, the second dynamic signature describing:
      positions of the points on the face in the second plurality of frames;
      distances between the points in the second plurality of frames; and
      deltas reflecting changes in the distances between the points through the second plurality of frames; and
   grant or deny the user access to a resource based at least on comparing the first structural signature and the second structural signature and comparing the first dynamic signature and the second dynamic signature.

2. The computer-readable storage medium of claim 1, wherein the instructions further cause the one or more hardware processors to:

compare the first structural signature and the second structural signature to provisionally identify the user; and compare the first dynamic signature and the second dynamic signature to confirm an identity of the user.

3. The computer-readable storage medium claim 1, wherein the first dynamic signature further describes correlations of the deltas through the first plurality of frames.

4. A system, comprising:

one or more processor devices; and one or more storage resources storing computer-readable instructions which, when executed by the one or more processor devices, cause the one or more processor devices to:

receive a first plurality of frames of a face of a user captured at a first series of times as the user performs a gesture that moves at least a portion of the face;

generate a first structural signature based on the first plurality of frames, the first structural signature describing a pose-invariant characteristic of the face that does not vary from pose to pose;

generate a first dynamic signature based on the first plurality of frames, the first dynamic signature describing deltas reflecting changes in distances between points on the face through the first plurality of frames;

receive a second plurality of frames of the face of the user captured at a second series of times as the user performs the gesture that moves at least the portion of the face;

generate a second structural signature based on the second plurality of frames, the second structural signature describing the pose-invariant characteristic of the face that does not vary from pose to pose;

generate a second dynamic signature based on the second plurality of frames, the second dynamic signature describing deltas reflecting changes in distances between the points on the face through the second plurality of frames; and comparing the first structural signature and the second structural signature and comparing the first dynamic signature and the second dynamic signature to authenticate the user.

5. The system of claim 4, wherein the pose-invariant characteristic includes a pose-invariant distance between landmarks on the body part face.

6. The system of claim 5, wherein the points described in the first dynamic signature are associated with a same portion of the body part face as the landmarks described in the first structural signature.

7. The system of claim 4, wherein the deltas reflect the changes in the distances between the points from one frame to a subsequent frame in the first plurality of frames.

8. The system of claim 4, wherein the first dynamic signature further describes correlations of the deltas through the first plurality of frames.

9. A method, comprising:

receiving a first plurality of frames of a face of a user captured at a first series of times as the user performs a gesture that moves at least a portion of the body part;

generating a first structural signature based at least on one of the first plurality of frames, the first structural signature describing an invariant characteristic of the face that does not vary throughout the first plurality of frames;

generating a first dynamic signature based on the first plurality of frames, the first dynamic signature describing:

positions of points on the face in the first plurality of frames;

distances between the points in the first plurality of frames; and deltas reflecting changes in the distances between the points through the first plurality of frames;

receiving a second plurality of frames of the face of the user captured at a second series of times as the user performs the gesture that moves at least the portion of the face;

generating a second structural signature based on the second plurality of frames, the second structural signature describing the invariant characteristic of the face;

generating a second dynamic signature based on the second plurality of frames, the second dynamic signature describing:

positions of the points on the face in the second plurality of frames;

distances between the points in the second plurality of frames; and deltas reflecting changes in the distances between the points through the second plurality of frames; and comparing the first dynamic signature and the second dynamic signature to confirm an identity of the user.

10. The method of claim 9, further comprising comparing the first structural signature and the second structural signature to determine a provisional identity of the user.

11. The method of claim 10, wherein determining the provisional identity of the user comprises identifying a pool of candidate users.

12. The method of claim 10, wherein the first structural signature and the second structural signature are compared before the first dynamic signature and the second dynamic signature are compared.

13. The method of claim 9, further comprising:

granting the user access to a resource upon successfully authenticating the user; or denying the user access to the resource upon failing to authenticate the user.

14. The method of claim 9, wherein generating the first dynamic signature comprises:

generating a plurality of original graphs corresponding to the first plurality of frames, the plurality of original graphs describing the points and the distances between the points in the first plurality of frames; and generating a plurality of delta graphs describing the deltas from one original graph to a subsequent original graph in the plurality of original graphs.

15. The method of claim 14, wherein generating the first dynamic signature further comprises:

generating a plurality of subgraphs based at least on the plurality of delta graphs and correlations of the deltas that describe the points moving in a same way through the first plurality of frames.

* * * * *